(12) United States Patent
Omaki et al.

(10) Patent No.: US 9,007,881 B2
(45) Date of Patent: Apr. 14, 2015

(54) OPTICAL HEAD DEVICE AND OPTICAL DISC DEVICE

(71) Applicants: Masayuki Omaki, Tokyo (JP); Kenya Nakai, Tokyo (JP); Nobuo Takeshita, Tokyo (JP)

(72) Inventors: Masayuki Omaki, Tokyo (JP); Kenya Nakai, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/357,745

(22) PCT Filed: Nov. 26, 2012

(86) PCT No.: PCT/JP2012/080463
§ 371 (c)(1),
(2) Date: May 12, 2014

(87) PCT Pub. No.: WO2013/103057
PCT Pub. Date: Jul. 11, 2013

(65) Prior Publication Data
US 2014/0321251 A1   Oct. 30, 2014

(30) Foreign Application Priority Data
Jan. 6, 2012   (JP) .................................. 2012-001334

(51) Int. Cl.
*G11B 7/00*   (2006.01)
*G11B 7/1353*   (2012.01)
(Continued)

(52) U.S. Cl.
CPC ............ *G11B 7/1353* (2013.01); *G11B 7/0903* (2013.01); *G11B 7/094* (2013.01); *G11B 7/125* (2013.01); *G11B 7/131* (2013.01); *G11B 2007/0013* (2013.01)

(58) Field of Classification Search
None
See application file for complete search history.

(56) References Cited

U.S. PATENT DOCUMENTS 5,923,632 A   7/1999   Kato et al.
7,245,565 B2   7/2007   Yamasaki et al.
(Continued)

FOREIGN PATENT DOCUMENTS

EP   0 562 158 A1   9/1993
JP   5-274698 A   10/1993
(Continued)

OTHER PUBLICATIONS

Blu-ray Disc Association, "White Paper Blu-ray Disc, 1.C Physical Format Specifications for BD-ROM", 5th Edition, Mar. 2007, pp. 1-35.
(Continued)

*Primary Examiner* — Thang Tran
(74) *Attorney, Agent, or Firm* — Birch, Stewart, Kolasch & Birch, LLP

(57) ABSTRACT

An optical head device (11) provided with: an optical element (36) for transmissively diffracting a light beam emitted from a semiconductor laser (34), generating a zero-order diffracted light beam and ±1-order diffracted light beams; and a photodetector (40) for receiving the zero-order diffracted light beam and the +1-order diffracted light beam after reflection from an optical disc (2). The photodetector (40) includes a primary light receiving section (400) for receiving the zero-order diffracted light beam, and a first secondary light receiving section (401) disposed outward from the primary light receiving section (400). The first secondary light receiving section (401) is positioned to detect an outer portion of the received light spot of the +1-order diffracted light beam, performs photoelectric conversion of this portion, and outputs a secondary detected signal.

6 Claims, 11 Drawing Sheets

(51) Int. Cl.
   *G11B 7/131* (2012.01)
   *G11B 7/09* (2006.01)
   *G11B 7/125* (2012.01)

(56) References Cited

U.S. PATENT DOCUMENTS

| | | | |
|---|---|---|---|
| 7,995,433 | B2 | 8/2011 | Nakahara |
| 8,040,780 | B2 | 10/2011 | Yamazaki et al. |
| 8,054,731 | B2 | 11/2011 | Kawasaki et al. |
| 8,305,851 | B2 | 11/2012 | Isshiki et al. |
| 8,472,300 | B2 * | 6/2013 | Shinoda et al. ............ 369/44.42 |
| 2008/0031119 | A1 * | 2/2008 | Ohnishi et al. ........... 369/112.07 |
| 2010/0322047 | A1 * | 12/2010 | Nakamura et al. ......... 369/44.37 |
| 2011/0128832 | A1 * | 6/2011 | Nakahara ................. 369/112.03 |
| 2012/0106310 | A1 | 5/2012 | Shinoda et al. |
| 2012/0182850 | A1 * | 7/2012 | Sato et al. ................. 369/112.03 |
| 2013/0010584 | A1 | 1/2013 | Nakata et al. |

FOREIGN PATENT DOCUMENTS

| | | |
|---|---|---|
| JP | 5-298739 A | 11/1993 |
| JP | 3687100 B2 | 8/2005 |
| JP | 2008-59632 A | 3/2008 |
| JP | 2010-61751 A | 3/2010 |
| JP | 2010-135017 A | 6/2010 |
| JP | 2011-86354 A | 4/2011 |
| JP | 2011-192369 A | 9/2011 |
| WO | WO 96/20473 A1 | 7/1996 |
| WO | WO 2004/038708 A1 | 5/2004 |
| WO | WO 2008/146511 A1 | 12/2008 |
| WO | WO 2011/086951 A1 | 7/2011 |
| WO | WO 2011/118177 A1 | 9/2011 |

OTHER PUBLICATIONS

Fuji, et al., "Observation of Eye Pattern on Super-Resolution Near-Field Structure Disk with Write-Strategy Technique", Japanese Journal of Applied Physics, 2004, pp. 4212-4215, vol. 43, No. 7A.

Kikukawa, et al., "Low Frequency Noise Reduction of Super-Resolution Near-Field Structure Disc with Platinum-Oxide Layer", ODS Technical Digest, ThC 3, 2005, 3 pages.

Nishihara, et al., "First proposal of 100 GB rewritable triple-layer optical disk using a GeTe-rich GeSbTe film and a new dielectric film with a high refractive index", Tech. Dig. Of ISOM2009, 2009, 2 pages, vol. Mo-D-03.

Shintani, et al., "Sub-Terabyte-Data-Capacity Optical Discs Realized by Three-Dimensional Pit Selection", Japanese Journal of Applied Physics, 2006, pp. 2593-2597, vol. 45, No. 4A.

* cited by examiner

OPTICAL HEAD DEVICE AND OPTICAL DISC DEVICE

TECHNICAL FIELD

The present invention relates to an optical head device for executing the recording or reproduction of information on an optical recording and reproducing medium, and to an optical disc device equipped with the optical head device.

BACKGROUND ART

Increased optical disc capacities have been achieved by decreasing the size of the recording marks written on the recording tracks on the information recording surfaces of optical discs, by using laser beams with shorter wavelengths to record and reproduce information, and by using objective lenses with larger numerical apertures, thereby reducing the size of the focused spot formed by the objective lens on the focal plane.

For example, a CD (compact disc), with a disc substrate functioning as a light transmitting layer substantially 1.2 mm thick (including a transparent protective layer disposed on the information recording layer and a spacer layer), a laser beam wavelength of substantially 780 nm, and an objective lens with a 0.45 numerical aperture (NA), can provide a recording capacity of 650 MB. A DVD (digital versatile disc), with a light transmitting layer substantially 0.6 mm thick, a laser beam wavelength of substantially 650 nm, and a 0.6 NA, can provide a recording capacity of 4.7 GB. The higher density BD (Blu-ray disc: registered trademark), using an optical disc with a light transmitting layer substantially 0.1 mm thick, a laser beam wavelength of substantially 405 nm, and a 0.85 NA, is capable of providing the large recording capacity of 25 GB per layer. BD details are disclosed in, for example, non-patent reference 1 below.

Optical disc capacity can be increased by increasing the number of information recording layers per optical disc. In a multilayer optical disc having multiple information recording layers, however, there is a problem of interlayer crosstalk, in which the quality of the reproduced RF signal and the quality of servo signals such as the tracking error signal is degraded by the detection not only of light reflected from the information recording layer (referred to below as the 'intended layer') on which information is to be recorded or from which information is to be reproduced but also light reflected from information recording layers other than the intended layer (referred to below as 'other-layer stray light'). Techniques for suppressing the above type of interlayer crosstalk are disclosed in, for example, JP 2011-86354 (patent reference 1).

Recently, high density recording systems that use optical discs in which there is formed a super-resolution functional layer having a nonlinear light absorbance characteristic or nonlinear light transmittance characteristic such that the refractive index varies locally with the light intensity have been under study in the optical recording field. In these high density recording systems, it is possible to reproduce marks smaller than the $\lambda/(4NA)$ diffraction limit determined by the wavelength $\lambda$ of the light and the numerical aperture NA of the focusing lens, which are optical elements of the optical disc device, by causing a super-resolution effect (a change in refractive index etc.) in a localized area of high light intensity or high temperature in the focused spot on the optical disc. An optical disc that generates this type of super-resolution effect is referred to as a super-resolution optical disc. Non-patent references 2 to 5, listed below, for example, may be cited as prior art references related to super-resolution optical discs.

For example, non-patent reference 2 in the list below discloses an optical disc having a super-resolution mask layer that generates a super-resolution effect. A change in refractive index occurs in this super-resolution mask layer as the super-resolution effect; the local area in which this super-resolution effect occurs is sometimes referred to simply as an 'aperture'. Non-patent references 2 and 3 in the list below disclose optical discs of the Super-RENS (Super REsolution Nearfield Structure) type that generate a super-resolution effect. Non-patent reference 4 in the list below proposes an optical disc which is formed by a material having a nonlinear light absorbance characteristic or nonlinear light transmittance characteristic such that the refractive index changes with the light intensity. The term 'super-resolution optical disc' will be used below to designate all optical discs that generate the super-resolution effects noted above. A major feature of super-resolution optical discs is that they can make use of BD and other conventional optical disc reproducing techniques, making it possible to obtain downward compatibility with BDs and other existing optical discs, which is considered difficult with other high-capacity technology, e.g., with hologram recording systems and near-field optical recording systems.

PRIOR ART REFERENCES

Patent Reference

Patent reference 1: JP 2011-86354 (FIGS. 5 and 6, paragraphs 0040-0046)

Non-Patent References

Non-patent reference 1: Blu-ray Disc White Paper 1.C: Physical Format Specifications for BD-ROM, 5th Edition, March 2007

Non-patent reference 2: "Observation of Eye Pattern on Super-Resolution Near-Field Structure Disk with Write-Strategy Technique", Jpn. J. Appl. Phys., Vol. 43, No. 7A, pp. 4212-4215 (2004)

Non-patent reference 3: "Low Frequency Noise Reduction of Super-Resolution Near-Field Structure Disc with Platinum-Oxide Layer", ODS Technical Digest, ThC3 (2005)

Non-patent reference 4: "Sub-Terabyte-Data-Capacity Optical Discs Realized by Three-Dimensional Pit Selection", Jpn. J. Appl. Phys., Vol. 45, No. 4A, pp. 2593-2597 (2006)

Non-patent reference 5: "First Proposal of 100 GB Rewritable Triple-layer Optical Disk using a GeTe-rich GeSbTe Film and a New Dielectric Film with a High Refractive Index", Tech. Dig. of ISOM 2009, Mo-D-03 (2009)

SUMMARY OF THE INVENTION

Problems to be Solved By the Invention

The optical head disclosed in patent reference 1 includes an optical element that generates a zero-order diffracted light beam and ±1-order diffracted light beams by transmissively diffracting the returning light beam from the optical disc, and a photodetector that receives the zero-order diffracted light beam and ±1-order diffracted light beams exiting the optical element. The photodetector includes a primary light receiving section that receives the zero-order diffracted light beam and a secondary light receiving section that receives the +1-order diffracted light beam. The secondary light receiving section is positioned to receive part of a semicircular arc shaped or semi-elliptical arc shaped received light spot of the +1-order diffracted light beam, so it is less susceptible to other-layer stray light, which is distributed around the primary light receiving section. Therefore, interlayer crosstalk can be suppressed.

In the optical head disclosed in patent reference 1, the shape of the received light spot detected by the secondary light receiving section is limited to a semicircular arc shape or semi-elliptical arc shape, and the light intensity distribution of the received light spot varies with objective lens shift (relative displacement of the objective lens from a reference position with respect to the photodetector). There is a limit to the precision with which the offset component due to the objective lens shift can be eliminated, because this component depends in particular on the displacement of the center of intensity of the light intensity distribution. Accordingly, when an objective lens shift occurs, it may not be possible to generate a stable tracking error signal.

While information is being reproduced or written, the tilt of the optical disc (disc tilt) generally degrades the quality of the reproduced signal. Super-resolution optical discs in particular tend to have a narrow tilt margin (allowable range of disc tilt). Since the tilt margin is inversely proportional to the thickness of the cover layer covering the information recording layer in the optical disc, even a super-resolution optical disc can provide a certain tilt margin by thinning the cover layer. However, if the cover layer of a super-resolution optical disc having multiple information recording layers is thinned, it may become necessary to narrow the spacing between the information recording layers in order to maintain downward compatibility with BDs and other existing optical discs. When the layer spacing is narrow, the above-mentioned effects of interlayer crosstalk become too great to ignore.

An object of the present invention is to provide an optical head device and an optical disc device that can effectively suppress interlayer crosstalk, even when information is written onto or reproduced from a multilayer optical disc, and can remove the offset component due to objective lens shift from the tracking error signal with high precision.

Means for Solving the Problems

An optical disc device according to a first aspect of the invention includes a semiconductor laser, an optical element for transmissively diffracting a light beam output from the semiconductor laser to generate a zero-order diffracted light beam, a +1-order diffracted light beam, and a −1-order diffracted light beam, an objective lens for focusing the +1-order diffracted light beam and the zero-order diffracted light beam to form a focused spot on an information recording layer of an optical disc; and a photodetector for receiving the +1-order diffracted light beam and the zero-order diffracted light beam after reflection from the optical disc. The photodetector includes a primary light receiving section having a first primary light receiving surface and a second primary light receiving surface aligned in a first direction corresponding to a radial direction of the optical disc, a first secondary light receiving section disposed in a position outwardly separated from the primary light receiving section in a positive direction of the first direction, and a first non-light-detection region disposed between the primary light receiving section and the first secondary light receiving section, extending continuously from an edge of the primary light receiving section in the positive direction of the first direction to an edge of the first secondary light receiving section in a negative direction of the first direction. The first primary light receiving surface and the second primary light receiving surface perform photoelectric conversion of the received light spot of the zero-order diffracted light beam and output, respectively, a first main detected signal and a second main detected signal. The first secondary light receiving section is positioned to detect an outer portion, in the positive direction of the first direction, of the received light spot of the +1-order diffracted light beam, performs photoelectric conversion of said portion, and outputs a first secondary detected signal. A remaining part of the received light spot of the +1-order diffracted light beam is directed onto the first non-light-detection region.

An optical disc device according to a second aspect of the invention includes an optical head device, a disc drive unit for spinning an optical disc, a signal processing unit for generating a tracking servo control signal on a basis of a signal detected by the optical head device, and a servo control unit for performing control to shift an objective lens in a radial direction of the optical disc in response to the tracking servo control signal. The optical head device includes a semiconductor laser, an optical element for transmissively diffracting a light beam output from the semiconductor laser to generate a zero-order diffracted light beam, a +1-order diffracted light beam, and a −1-order diffracted light beam, an objective lens for focusing the +1-order diffracted light beam and the zero-order diffracted light beam to form a focused spot on an information recording layer in the optical disc, and a photodetector for receiving the +1-order diffracted light beam and the zero-order diffracted light beam after reflection from the optical disc. The photodetector includes a primary light receiving section having a first primary light receiving surface and a second primary light receiving surface aligned in a first direction corresponding to the radial direction of the optical disc, and a first secondary light receiving section disposed in a position outwardly separated from the primary light receiving section in a positive direction of the first direction. The first primary light receiving surface and the second primary light receiving surface perform photoelectric conversion of the received light spot of the zero-order diffracted light beam and output, respectively, a first main detected signal and a second main detected signal. The first secondary light receiving section has a plurality of secondary light receiving surfaces aligned in the first direction. The plurality of secondary light receiving surfaces include a first outer secondary light receiving surface disposed in a position most widely separated from the primary light receiving section in the positive direction of the first direction. The signal processing unit generates a main push-pull signal on a basis of the first primary detected signal and the second primary detected signal, detects an offset component due to relative displacement of the objective lens with respect to the light receiving element, on a basis of the first secondary detected signal, and generates the tracking error signal by deducting the offset component from the push-pull signal.

An optical head device according to a third aspect of the invention includes a semiconductor laser, an objective lens for focusing a single light beam emitted from the semiconductor laser to form a focused spot on an information recording layer of an optical disc, an optical element for transmissively diffracting a returning light beam reflected from the optical disc; and a photodetector for receiving the transmissively diffracted light beam. The returning light beam includes reflectively diffracted light diffracted by the optical disc. The optical element includes a primary diffraction region disposed in a position where part of a zero-order reflectively diffracted light component and part or all of ±1-order reflectively diffracted light components in the reflectively diffracted light are incident, having a zero-order diffractive effect and a ±1-order diffractive effect, and a pair of secondary diffraction regions disposed outward of the primary diffraction region in a second direction orthogonal to a first direction, the first direction being a direction of a row formed by the zero-order reflectively diffracted light component and the ±1-order reflectively diffracted light components, in positions where a remaining part of the zero-order reflectively diffracted light component is incident, having the zero-order diffractive effect and the ±1-order diffractive effect. The photodetector includes a primary light receiving section having a first primary light receiving surface and a second primary light receiving surface aligned in a first direction corresponding to a radial direction of the optical disc, a first secondary light receiving section disposed in a position outwardly separated from the primary light receiving section in a positive direction of the first direction, and a first non-light-detection region disposed between the primary light receiving section and the first secondary light receiving section, extending continuously from an edge of the primary light receiving section in the positive direction of the first direction to an edge of the first secondary light receiving section in a negative direction of the first direction. The first primary light receiving surface and the second primary light receiving surface perform photoelectric conversion of the received light spot of the zero-order diffracted light beam that has passed through both the primary diffraction region and the pair of secondary diffraction regions and output, respectively, a first main detected signal and a second main detected signal. The first secondary light receiving section is positioned to detect an outer portion, in the positive direction of the first direction, of the received light spot of the +1-order diffracted light beam generated by the +1-order diffractive effect of the pair of secondary diffraction regions, performs photoelectric conversion of said portion, and outputs a first secondary detected signal. A remaining part of the received light spot of the +1-order diffracted light beam is directed onto the first non-light-detection region.

An optical disc device according to a fourth aspect of the invention includes the optical head device of the above third aspect, a disc drive unit for spinning the optical disc, a signal processing unit for generating a tracking servo control signal on a basis of a signal detected by the optical head device, and a servo control unit for performing control to shift the objective lens in a radial direction of the optical disc in response to the tracking servo control signal. The signal processing unit generates a main push-pull signal on a basis of the first primary detected signal and the second primary detected signal, detects an offset component due to relative displacement of the objective lens with respect to the light receiving element, on a basis of the first secondary detected signal, and generates the tracking error signal by deducting the offset component from the push-pull signal.

Effect of the Invention

According to the present invention, even when information is written onto or reproduced from a multilayer optical disc, interlayer crosstalk can be suppressed effectively, and the variation in offset (offset component) due to objective lens shift can be removed from the tracking error signal with high precision.

MODE FOR CARRYING OUT THE INVENTION

Figure 1:
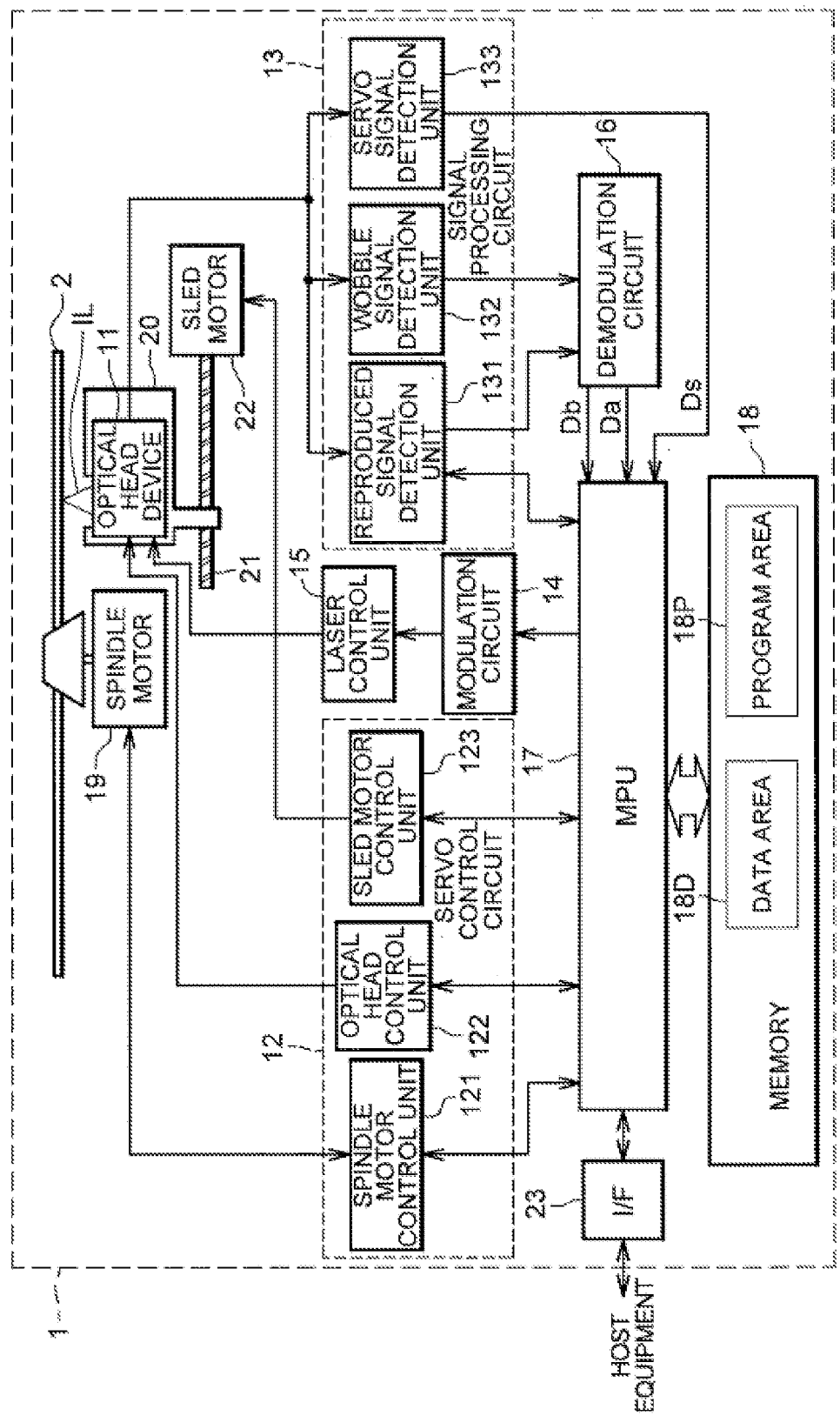
FIG. 1 schematically shows the main elements of an optical disc device in a first embodiment of the invention.

Various embodiments of the invention will now be described with reference to the drawings. In the drawings, like elements are denoted by like reference numerals, and duplication of their detailed descriptions will be avoided.

First Embodiment

FIG. 1 schematically shows the main elements of an optical disc device 1 in a first embodiment of the present invention. As shown in FIG. 1, the optical disc device 1 includes an optical head device 11, a servo control circuit 12, a signal processing circuit 13, a modulation circuit 14, a laser control circuit 15, a demodulation circuit 16, an MPU (Micro Processing Unit) 17, and a memory 18. The MPU 17 is a controller that executes control processes in accordance with commands supplied from host equipment (not shown) through an interface (I/F) 23.

The servo control circuit 12 includes a spindle motor control unit 121, an optical head control unit 122, and a sled motor control unit 123; the spindle motor control unit 121, optical head control unit 122, and sled motor control unit 123 operate in response to commands received separately from the MPU 17. The signal processing circuit 13 includes a reproduced signal detection unit (RF signal detection unit) 131, a wobble signal detection unit 132, and a servo signal detection unit 133.

An optical disc 2 is detachably mounted on a turntable secured to the drive shaft (spindle) of the spindle motor 19. Under control of the spindle motor control circuit 121, the spindle motor 2 spins the optical disc. Operating in accordance with commands from the MPU 17, the spindle control circuit 121 executes spindle servo control to make the actual rotational speed match a target rotational speed on the basis of a pulse signal representing the rotational speed supplied from the spindle motor 19.

The optical head device 11 illuminates the optical disc 2 with a laser light beam IL, receives the returning light beam reflected by an information recording layer in the optical disc 2, generates an electrical signal, and outputs the electrical signal to the signal processing circuit 13. The optical disc 2 may be a single-layer optical disc having a single information recording layer or a multilayer optical disc having a plurality of information recording layers. Exemplary optical discs 2 include a CD (Compact Disc), DVD (Digital Versatile Disc), and BD (Blu-ray Disc), but this is not a limitation. The optical disc 2 may also be a super-resolution optical disc.

The sled motor control unit 123 controls the operation of the sled motor 22 in accordance with commands from the MPU 17. The sled motor 22 operates as controlled by the sled motor control unit 123. More specifically, the sled motor 22 moves a frame 20 in a radial direction (a direction of the radius) of the optical disc 2 by transmitting torque to a translational mechanism 21 such as a rack and a pinion. The optical head device 11 is affixed to the frame 20 and is positioned by moving together with the frame 20.

The signals detected by the optical head device 11 are supplied to the signal processing circuit 13 through a bus (not shown). In the signal processing circuit 13, the reproduced signal detection unit 131 generates a reproduced RF signal (reproduced signal) from the detected signals supplied from the optical head device 11 and outputs the reproduced RF signal to the demodulation circuit 16. The reproduced signal detection unit 131 also generates a signal representing the signal amplitude value of the reproduced RF signal and signals representing statuses such as the quality of the reproduced RF signal and supplies these signals to the MPU 17. If the optical disc 2 has a pattern (wobble pattern) of track guide grooves wobbling at a given spatial frequency, the wobble signal detection unit 132 generates a wobble signal from a detected component of the light reflected from the track guide grooves. The wobble signal is output to the demodulation circuit 16. If the optical disc 2 is a disc of the ROM (Read Only Memory) type, which does not have a wobble pattern, the function of the wobble signal detection unit 132 is not required.

The servo signal detection unit 133 can generate servo signals Ds (such as a focus error signal and a tracking error signal) for feedback control in accordance with the detected signals received from the optical head device 11. These servo signals Ds are supplied through the MPU 17 to the optical head control unit 122.

The MPU 17 has the function of controlling the entire operation of the optical disc device 1 in response to signals supplied from elements 131 to 133 in the signal processing circuit 13 and elements 121 to 123 in the servo control circuit 12. The MPU 17 can control the operation of elements 131 to 133 and 121 to 123 independently by supplying them with control data. The MPU 17 may have some of the functions of the elements 131 to 133 in the signal processing circuit 13.

The demodulation circuit 16 has the function of generating a binary data string by performing a binarizing process on the reproduced RF signal supplied from the reproduced signal detection unit 131 and generating reproduced data Da by performing RLL (run length limited) decoding and error correction, for example, on the binary data string. The reproduced data Da are supplied to the MPU 17. The MPU 17 can transfer the reproduced data Da through the I/F 23 to the host equipment. The demodulation circuit 16 also has the function of generating data Db representing address information and synchronization information by performing, for example, MSK (Minimum-Shift-Keying) demodulation or STW (Saw-Tooth-Wobble) demodulation on the wobble signal supplied from the wobble signal detection unit 132. The data Db are supplied to the MPU 17 and the servo control circuit 12.

As shown in FIG. 1, the memory 18 includes a program area 18P and a data area 18D. The MPU 17 can read the data of programs stored in the program area 18P of the memory 18 and can execute the programs by using the data area 18D. By so doing, the MPU 17 can control the operation of the elements in the optical disc device 1 and can make decisions for control purposes on the basis of signals output from the elements.

The optical head control unit 122 operates in accordance with commands from the MPU 17 and controls the operation of the optical head device 11. More specifically, the optical head control unit 122 generates drive signals for focusing and tracking of the light beam IL directed onto the optical disc 2 in accordance with the focus error and tracking error signals included in the servo signals Ds, and supplies these drive signals to actuators in the optical head device 11.

Figure 2:
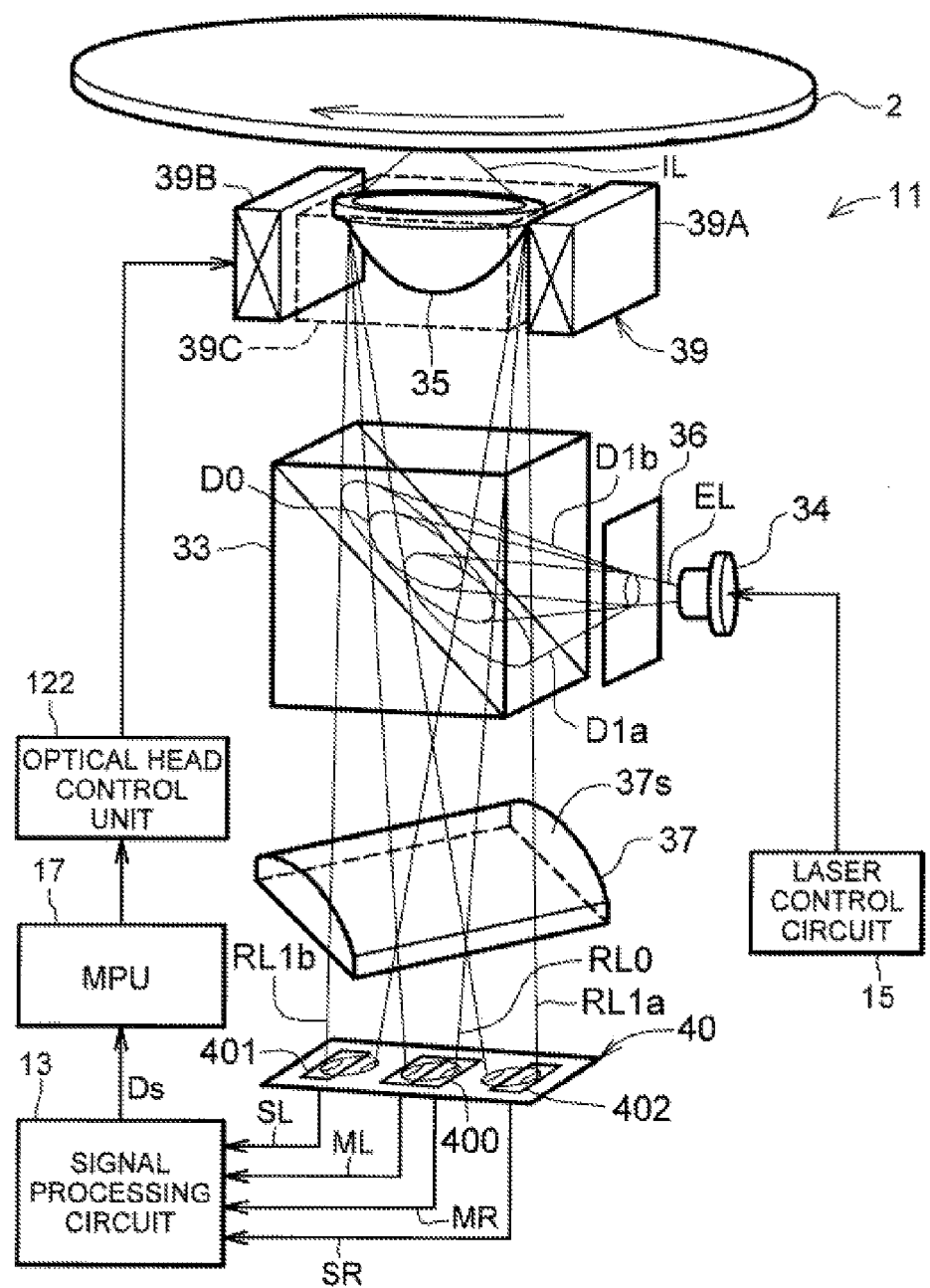
FIG. 2 schematically shows the basic configuration of the optical head device in the first embodiment.

FIG. 2 schematically shows the basic configuration of the optical head device 11 in the first embodiment. As shown in FIG. 2, the optical head device 11 includes a semiconductor laser 34, an optical element 36, a beam splitter 33, an objective lens 35, an actuator 39, a cylindrical lens 37, and a photodetector 40. FIG. 2 shows the elements in the optical detection system in order to illustrate the basic structure and operating principle of the optical head device 11 in this embodiment; the configuration of the optical head device 11 is not limited to the configuration shown in FIG. 2. For example, the optical head device 11 may include a sensor optical system for detecting the amount of focusing error or tracking error of the objective lens 35 with respect to the information recording layer in the optical disc 2.

When data are reproduced from the optical disc 2, the laser control circuit 15 in FIG. 1 operates in accordance with commands from the MPU 17 and controls the semiconductor laser 34 (FIG. 2) in the optical head device 11 to have the semiconductor laser 34 output laser light EL with the emitted power needed to reproduce the data. When data are written onto the optical disc 2, the modulation circuit 14 in FIG. 1 generates write data by adding an error correcting code to the data output from the MPU 17 and performing data modulation. The modulation circuit 14 then generates a write strategy signal based on the write data. The laser control circuit 15 controls the semiconductor laser 34 in the optical head device 11 in accordance with the write strategy signal and has the semiconductor laser 34 output laser light EL with the emitted power needed to write the data.

The light beam EL output from the semiconductor laser 34 enters optical element 36, which is a transmissive diffraction grating. Optical element 36 is made of glass or transparent plastic. A diffraction grating structure which provides mainly zero-order and ±1-order diffraction efficiency is formed on either one or both of the light incidence surface and the light exit surface of optical element 36. Optical element 36 transmits and diffracts the light beam EL from the semiconductor laser 34 and generates a zero-order diffracted light beam D0, a +1-order diffracted light beam D1$b$, and a −1-order diffracted light beam D1$a$. The zero-order diffracted light beam D0, +1-order diffracted light beam D1$b$, and −1-order diffracted light beam D1$a$ are reflected by the beam splitter 33 and output toward the objective lens 35. As the beam splitter 33, a cubic half mirror can be used as shown in FIG. 2, but this is not a limitation. Instead of the beam splitter 33 shown in FIG. 2, a parallel-plate beam splitter may be used.

Figure 3:
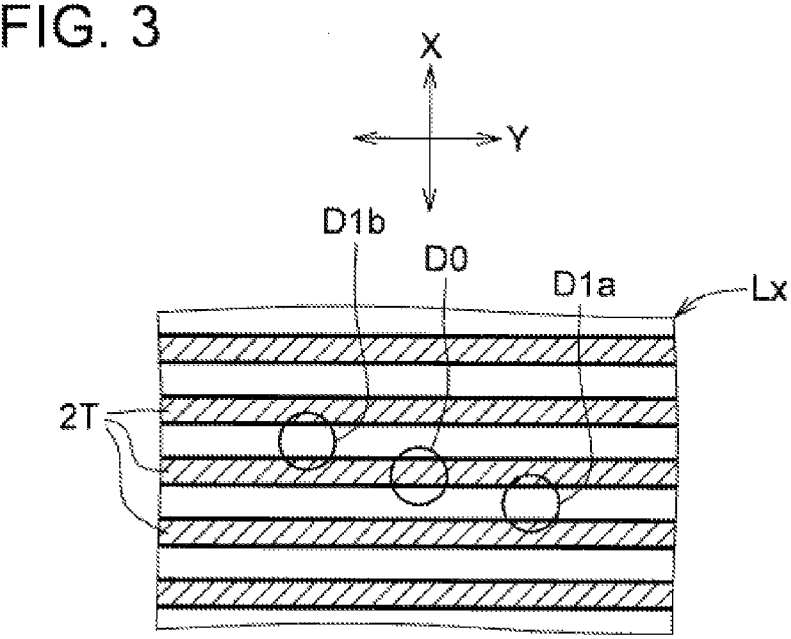
FIG. 3 schematically shows focused spots on an information recording layer in an optical disc.

The objective lens 35 is an optical element that focuses the incident light beam from the semiconductor laser 34 and forms a focused spot on the information recording layer in the optical disc 2. FIG. 3 schematically shows a focused spot in an information recording layer Lx in the optical disc 2. The information recording layer Lx includes a plurality of information tracks 2T regularly arrayed in the radial direction X of the optical disc 2, each information track 2T extending in the tangential direction Y of the optical disc 2. These information tracks 2T are formed concentrically or spirally with respect to the center of the optical disc 2. As shown in FIG. 3, the zero-order diffracted light beam D0 forms a focused spot on the information track 2T where information is being written or reproduced, and the −1-order diffracted light beam D1a and +1-order diffracted light beam D1b form respective focused spots in positions displaced by substantially half a track in the radial direction X from the focused spot of the zero-order diffracted light beam D0.

The actuator 39 in FIG. 2 can move the objective lens 35 to make the focused spot follow an information track in the information recording layer. The actuator 39 includes magnetic circuits 39A, 39B and a movable section 39C disposed between the magnetic circuits 39A and 39B, as schematically shown in FIG. 2. The movable section 39C includes a lens holder (not shown) for securing the objective lens 35 and a focus coil and tracking coil (both not shown) wound around the lens holder. The objective lens 35 can be moved in the focusing direction (the direction of the optical axis of the objective lens 35) by a drive current (drive signal) supplied to the focus coil; the objective lens 35 can be moved in the radial direction of the optical disc 2 by a drive current (drive signal) supplied to the tracking coil. Accordingly, the optical head device 11, servo signal detection unit 133, and optical head control unit 122 form a focus servo loop and a tracking servo loop.

The returning light beam reflected by the optical disc 2 is changed to a convergent light beam by the objective lens 35, passes through the beam splitter 33, and then enters the cylindrical lens 37. The cylindrical lens 37 is an optical element that induces astigmatism in the light beam passing through it. As shown in FIG. 2, the cylindrical lens 37 has a cylindrical surface 37s as its light incidence surface; the cylindrical surface 37s has a direction without curvature as its generator direction and is curved in a direction substantially orthogonal to the generator direction. Therefore, the curvature of the lens surface in the generator direction differs from the curvature in the orthogonal direction. The cylindrical lens 37 consequently causes a difference between the focusing position of rays in a plane parallel to the generator direction and the focusing position of rays in the plane orthogonal to the generator direction. A substantially circular received light spot can be formed on the light receiving surface of the photodetector 40 by designing and placing the cylindrical lens 37 so that when the position of the objective lens 35 matches the focusing position with respect to the information recording layer in the optical disc 2, the image height in the generator direction of the cylindrical lens 37s becomes approximately equal to the image height in a direction substantially orthogonal to the generator direction. The shape of the received light spot is distorted to a substantially elliptical shape in accordance with the displacement of the objective lens 35 from the focusing position, that is, with the defocusing quantity. The focus error signal detection method based on this principle is generally known as the astigmatic method. A focus error signal can be generated by the astigmatic method by using the light receiving surface pattern in FIG. 7, as described later.

The SSD (Spot Size Detection) method of focus servo control, for example, can also be used here. With the SSD method, a hologram element can be used instead of the cylindrical lens 37.

The returning light beam that has passed through the cylindrical lens 37 is directed onto the photodetector 40. The primary light receiving section 400 of the photodetector 40 receives the returning light beam RL0 as the zero-order diffracted light beam D0 reflected by the optical disc 2. The first secondary light receiving section 401 and second secondary light receiving section 402 of the photodetector 40 receive the returning light beam RL1b and the returning light beam RL1a respectively as the +1-order diffracted light beam D1b and the −1-order diffracted light beam D1a reflected by the optical disc 2.

Figure 4:
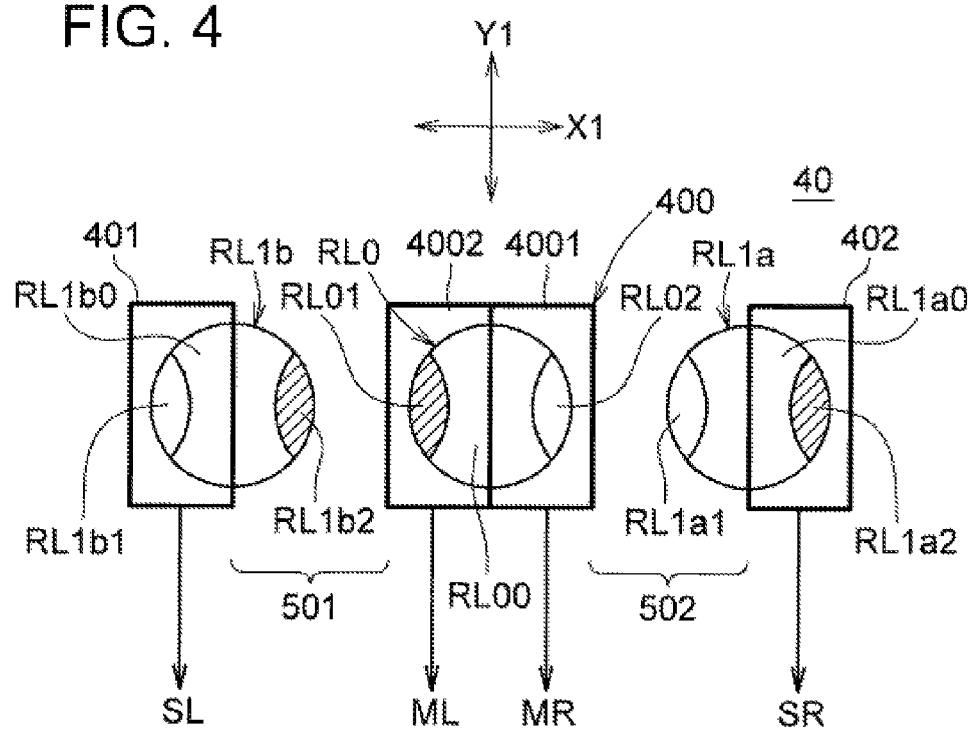
FIG. 4 schematically shows the light spot of a returning light beam directed onto a photodetector in the first embodiment.

FIG. 4 schematically shows the light spots of returning light beams RL0, RL1b, RL1a directed onto the photodetector 40. The photodetector 40 is formed by using a photodiode, for example. As shown in FIG. 4, the photodetector 40 includes a primary light receiving section 400 that receives the light spot of returning light beam RL0, which is the zero-order diffracted light, a first secondary light receiving section 401 that receives part of the light spot of returning light beam RL1b, which is the +1-order diffracted light, on a single light receiving surface, and a second secondary light receiving section 402 that receives part of the light spot of returning light beam RL1a, which is the −1-order diffracted light, on a single light receiving surface.

The photodetector 40 includes a non-light-detection region 501 lying between the primary light receiving section 400 and the first secondary light receiving section 401 and a non-light-detection region 502 lying between the primary light receiving section 400 and the second secondary light receiving section 402. These non-light-detection regions 501, 502 are regions where photoelectric conversion of light illuminating the regions is not performed. As shown in FIG. 4, non-light-detection region 501 extends continuously from the edge in the positive X1-axis direction (left in the figure) of the primary light receiving section 400 to the edge in the negative X1-axis direction (right in the figure) of the first secondary light receiving section 401. The other non-light-detection region 502 extends continuously from the edge in the negative X1-axis direction (right in the figure) of the primary light receiving section 400 to the edge in the positive X1-axis direction (left in the figure) of the second secondary light receiving section 402.

The primary light receiving section 400 is divided into a first main light receiving surface 4001 and a second main light receiving surface 4002; the first main light receiving surface 4001 and second main light receiving surface 4002 are aligned in the X1-axis direction, which corresponds to the objective lens shift direction. The X1-axis direction corresponds to the direction of diffraction by optical element 36. The first main light receiving surface 4001 and second main light receiving surface 4002 in the primary light receiving section 400 receive the returning light beam RL0 of the zero-order diffracted light, generate respective electrical signals MR and ML corresponding to the amount of received light, and supply the electrical signals MR and ML to the signal processing circuit 13. The first main light receiving surface 4001 outputs electrical signal MR; the second main light receiving surface 4002 outputs electrical signal ML.

The first secondary light receiving section 401 is disposed outward of the primary light receiving section 400 in the positive X1-axis direction (left); the second secondary light receiving section 402 is disposed outward of the primary light receiving section 400 in the negative X1-axis direction (right). The first secondary light receiving section 401 receives part of the returning light beam RL1*b* of the +1-order diffracted light, generates an electrical signal SL in accordance with the amount of received light, and supplies electrical signal SL to the signal processing circuit 13. The first secondary light receiving section 401 is disposed in a position where just an outer portion of the received light spot of returning light beam RL1*b* is detected, as shown in FIG. 4, and outputs electrical signal SL by performing photoelectric conversion of that portion. The remaining portion of the received light spot of the returning light beam RL1*b* illuminates non-light-detection region 501 and is not subjected to photoelectric conversion.

The second secondary light receiving section 402 receives part of the returning light beam RL1*a* of the −1-order diffracted light, generates an electrical signal SR in accordance with the amount of received light, and supplies this electrical signal SR to the signal processing circuit 13. The second secondary light receiving section 402 is disposed in a position where just an outer portion of the received light spot of returning light beam RL1*a* is detected, as shown in FIG. 4, and outputs electrical signal SR by performing photoelectric conversion of that portion. The remaining portion of the received light spot of the returning light beam RL1*a* illuminates non-light-detection region 502 and is not subjected to photoelectric conversion. As described later, the signal processing circuit 13 generates servo signals Ds based on electrical signals MR, ML, SR, SL. The servo signals Ds are supplied through the MPU 17 to the optical head control unit 122.

The returning light beam reflected by the information recording layer in the optical disc 2 includes diffracted light (referred to as 'reflectively diffracted light' below) due to the periodic structure of the information tracks in the information recording layer. Accordingly, the returning light beam RL0 illuminating the primary light receiving section 400 of the photodetector 40 includes a zero-order reflectively diffracted light component RL00 having a substantially circular shape and also includes a +1-order reflectively diffracted light component RL01 and a −1-order reflectively diffracted light component RL02, which overlap the zero-order reflectively diffracted light component RL00 as shown in FIG. 4.

The +1-order reflectively diffracted light component RL01 and the −1-order reflectively diffracted light component RL02 respectively interfere with the zero-order reflectively diffracted light component RL00, and in the interference region, the light density fluctuates with the positional relationship between the focused spot and information tracks in the information recording layer. The tracking servo control signal is generated by detecting the fluctuation in light density (referred to as 'push-pull' below) as the tracking error quantity. Since the +1-order reflectively diffracted light component RL01 and the −1-order reflectively diffracted light component RL02 have opposite phases, when the zero-order reflectively diffracted light component RL00 and the +1-order reflectively diffracted light component RL01 reinforce each other, the zero-order reflectively diffracted light component RL00 and the −1-order reflectively diffracted light component RL02 are in a mutually weakening relation.

The returning light beams RL1*b* and RL1*a* directed respectively onto the first secondary light receiving section 401 and second secondary light receiving section 402 include a reflectively diffracted light component. Whereas returning light beam RL0 was reflected from the information track 2T where information is being written or reproduced, returning light beams RL1*b* and RL1*a* were reflected from positions displaced by substantially half a track from this information track 2T. If, for example, the zero-order reflectively diffracted light component RL1*a*0 and the +1-order reflectively diffracted light component RL1*a*1 of returning light beam RL1*a* reinforce each other, the zero-order reflectively diffracted light component RL00 and the +1-order reflectively diffracted light component RL01 are in a mutually weakening relation. Returning light beams RL1*a* and RL1*b* maintain substantially identical relative positional relations to the information track 2T. Therefore, when the zero-order reflectively diffracted light component RL1*a*0 and the +1-order reflectively diffracted light component RL1*a*1 reinforce each other, for example, the zero-order reflectively diffracted light component RL1*b*0 and the +1-order reflectively diffracted light component RL1*b*1 of the returning light beam RL1*b* also reinforce each other.

Next, the method of generating the tracking servo control signal will be described. The tracking servo that makes the illuminating light beam IL follow an information track on the optical disc 2 uses a push-pull signal that changes its signal level in accordance with the positional relationship between the point of focus of the illuminating light beam IL and the information track on the optical disc 2. In this embodiment, the servo signal detection unit 133 can generate a push-pull signal PP as a tracking servo control signal according to the following equations (1), (1a):

$$PP = MPP + k \times (S_E - S_H) \tag{1}$$

$$MPP = S_{AD} - S_{BC} \tag{1a}$$

In equation (1), $S_{AD}$ represents the detected signal obtained from the output signal MR of the first main light receiving surface 4001; $S_{BC}$ represents the detected signal obtained from the output signal ML of the second main light receiving surface 4002; $S_E$ represents the detected signal obtained from the output signal SL of the first secondary light receiving section 401; $S_H$ represents the detected signal obtained from the output signal SR of the second secondary light receiving section 402; and k is a gain coefficient. MPP in equation (1a) is the main push-pull signal.

Figure 5:
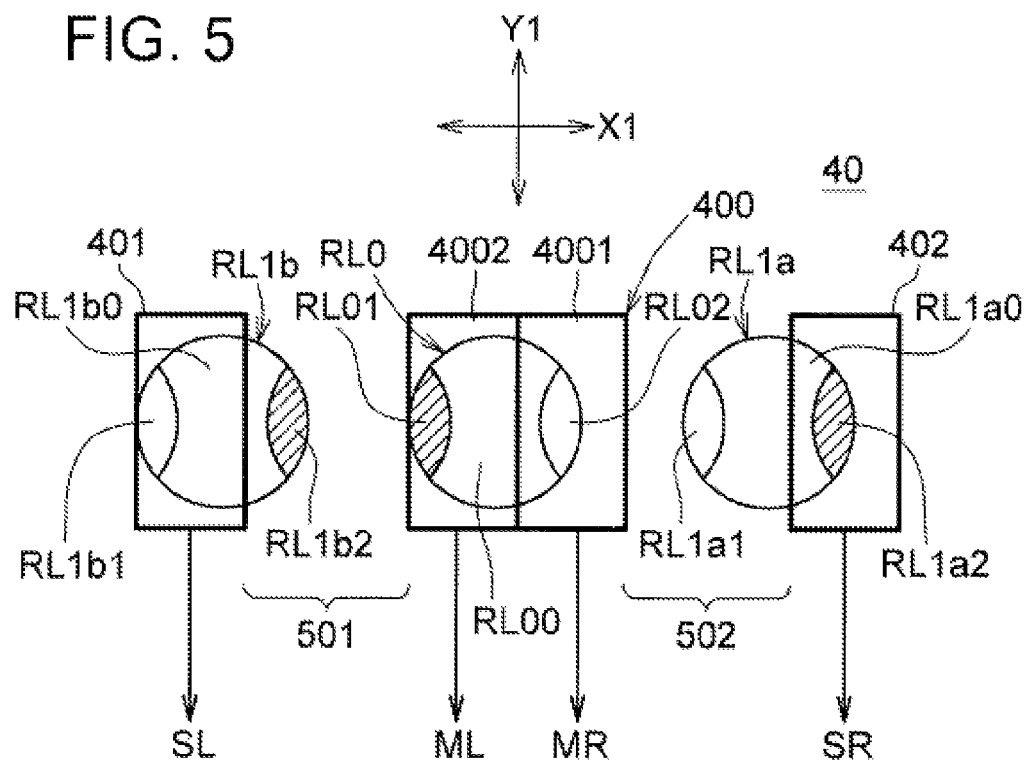
FIG. 5 schematically shows the light spot on the photodetector when the objective lens in the first embodiment is shifted from its reference position.

FIG. 5 schematically shows the light spots on the light receiving surfaces of the photodetector 40 when the objective lens 35 shifts from its reference position to follow an information track. FIG. 4 shows the light spots when the objective lens 35 is at the reference position, substantially its center position. As shown in FIG. 5, when objective lens shift moves all of the light spots of the returning light beams RL0, RL1*a*, RL1*b* to the left from the reference position with respect to the photodetector 40, the signal level of the main push-pull signal MPP ($=S_{AD} - S_{BC}$) decreases. At the same time, the amount of light received by the first secondary light receiving section 401 increases and the amount of light received by the second secondary light receiving section 402 decreases, so the ($S_E - S_H$) signal level increases.

That indicates that with respect to objective lens shift, the main push-pull signal MPP and the $S_E$ signal component have mutually opposite phases, and the main push-pull signal MPP and the $-S_H$ signal component also have mutually opposite phases. By amplifying the $S_E - S_H$ signal component by an appropriately adjusted gain coefficient k, an offset component $-k \times (S_E - S_H)$ due to the objective lens shift can be generated. This offset component can be removed from the main push-pull signal MPP by using equation (1) above.

The push-pull signal PPL or PPR given by the following equation (1A) or (1B) may be used instead of using equation (1) above.

$$PPL = MPP + k \times S_E \quad (1A)$$

$$PPR = MPP + k \times (-S_H) \quad (1B)$$

The offset components here are $-k \times S_E$ and $k \times S_H$.

The optical head control unit 122 can make the illuminating light beam IL follow the information track on the optical disc 2 by controlling the operation of the actuator 39 to bring the signal level of the push-pull signal given by equation (1), (1A), or (1B) to zero.

The reproduced signal $S_{RF}$ can be generated according to equation (2) below.

$$S_{RF} = S_{AD} + S_{BC} \quad (2)$$

With respect to objective lens shift, the $S_{AD}$ and $S_{BC}$ signal components of the reproduced signal $S_{RF}$ have mutually opposite phases. When objective lens shift causes an increase in the signal level of the $S_{AD}$ signal component, the signal level of the $S_{BC}$ signal component decreases. When objective lens shift causes a decrease in the signal level of the $S_{AD}$ signal component, the signal level of the $S_{BC}$ signal component increases. The offset due to objective lens shift is therefore cancelled by addition of these two signal components $S_{AD}$ and $S_{BC}$.

As described above, the signal processing circuit 13 in the first embodiment can generate a signal component $-k \times (S_E - S_H)$, $-k \times S_E$, or $k \times S_H$ corresponding to the offset component due to objective lens shift in accordance with the electrical signals SL and SR detected by the first secondary light receiving section 401 and the second secondary light receiving section 402 and can generate a push-pull signal PP, PPL, or PPR with the offset component removed. These signal components can be generated easily by using a photodetector 40 having a simple light receiving surface pattern as shown in FIG. 4.

As shown in FIG. 4, the light spot received by the first secondary light receiving section 401 includes a portion in which the zero-order reflectively diffracted light component RL1b0 and the +1-order reflectively diffracted light component RL1b1 overlap, but does not include the −1-order reflectively diffracted light component RL1b2. The light spot received by the second secondary light receiving section 402 includes a portion in which the zero-order reflectively diffracted light component RL1a0 and the −1-order reflectively diffracted light component RL1a2 overlap, but does not include the +1-order reflectively diffracted light component RL1a1. Accordingly, when the focused spot goes off-track from the information track (the focused spot is displaced from the center of the target information track toward the inner perimeter of the disc or toward the outer perimeter of the disc), the push-pull component in the first secondary light receiving section 401 stays in phase with the push-pull component in the first main light receiving surface 4001, while the push-pull component in the second secondary light receiving section 402 is in reverse phase with the push-pull component in the first main light receiving surface 4001. 'Push-pull component' means a component in which the amount of received light varies as the focused spot goes off-track, and mainly indicates a light component in which the zero-order reflectively diffracted light component and the +1-order reflectively diffracted light component overlap or a light component in which the zero-order reflectively diffracted light component and the −1-order reflectively diffracted light component overlap.

Consequently, when the focused spot goes off-track, the main push-pull signal MPP ($=S_{AD}-S_{BC}$) and the $S_E$ signal component stay in phase with each other, and the main push-pull signal MPP and the $-S_H$ signal component stay in phase with each other. When the push-pull signal PP, PPL, or PPR is generated in accordance with equation (1), (1A), or (1B), the detected push-pull signal components of the same phase are added, so a tracking servo control signal having a sufficiently large amplitude can be obtained.

An advantage is that the light receiving surface pattern of the photodetector 40 can have a simple structure, because the first secondary light receiving section 401 and second secondary light receiving section 402 each have a single light receiving surface, as shown in FIG. 4.

As noted above, the push-pull signal PPL or PPR based on equation (1A) or (1B) instead of equation (1) can be used as the tracking servo control signal, but it is preferable to use equation (1) rather than equation (1A) or (1B) from the viewpoint of improving immunity to external noise, temperature changes, or light beam wavelength variation. Since signal components $S_E$ and $S_H$ in equation (1) are in phase and vary by substantially equal amounts, the effect of external noise, temperature changes, or light beam wavelength variation can be cancelled by taking the difference ($=S_E-S_H$) between the $S_E$ and $S_H$ signal components. Light beam wavelength variation or a change in the grating spacing of optical element 36 due to temperature variation or may change the absolute value of the diffraction angle. In that case, the positions illuminated by the light spots of returning light beams RL1a and RL1b in FIG. 4 change, changing the amount of light received by either or both of the first secondary light receiving section 401 and second secondary light receiving section 402. This type of change in the amount of received light can also be cancelled by taking the difference ($=S_E-S_H$) between the $S_E$ and $S_H$ signal components.

In the conventional optical head disclosed in patent reference 1, the shape of the received light spot detected by the secondary light receiving section is limited to a semicircular arc shape or a semi-elliptical arc shape, and the push-pull component of the received light spot is not detected by the secondary light receiving section. The conventional optical head detects the signal component corresponding to the offset due to objective lens shift depending on the displacement of the center of intensity in the light intensity distribution of the semicircular arc shaped or semi-elliptical arc shaped received light spot. The light intensity distribution in the received light spot is related to the focusing of the light; if the size of the focused spot is decreased to improve the offset rejection performance, the preferred way is to decrease the diameter of the focused spot and at the same time to uniformize (flatten) the light intensity distribution in the focused spot as much as possible. However, reduction in diameter of the focused spot and uniformization of the light intensity distribution constrain each other, so there is a limit to the extent to which it is possible both to improve the focusing and cancel the offset component added to the push-pull signal. If the optical disc 2 is a multilayer optical disc, the noise component due to stray light from other layers that is added to the received light spot makes it especially hard to cancel the offset component, lowering the S/N ratio of the push-pull signal. In the conventional optical head disclosed in patent reference 1, since the precision of removal of the offset component due to objective lens shift depends on the displacement of the center of light intensity of the semi-circular or semi-elliptical received light spot, the degree of freedom in the design of the photodetector in patent reference 1 is low; there are major design constraints.

In contrast, as the focused spot in the optical head device 11 in this embodiment goes off-track, since the main push-pull signal MPP and the $S_E$ signal component are in phase and the main push-pull signal MPP and the $-S_H$ signal component are also in phase, as described above, a push-pull signal PP, PPL, or PPR with a large amplitude can be obtained, providing immunity to the effects of noise due to other-layer stray light. In addition, since the first secondary light receiving section 401 is positioned to receive an outer portion of the received light spot of returning light beam RL1b, and the second secondary light receiving section 402 is positioned to receive an outer portion of the received light spot of returning light beam RL1a, as shown in FIG. 4, the noise component due to other-layer stray light distributed around the central point of the primary light receiving section 400 can be effectively suppressed.

Figure 6:
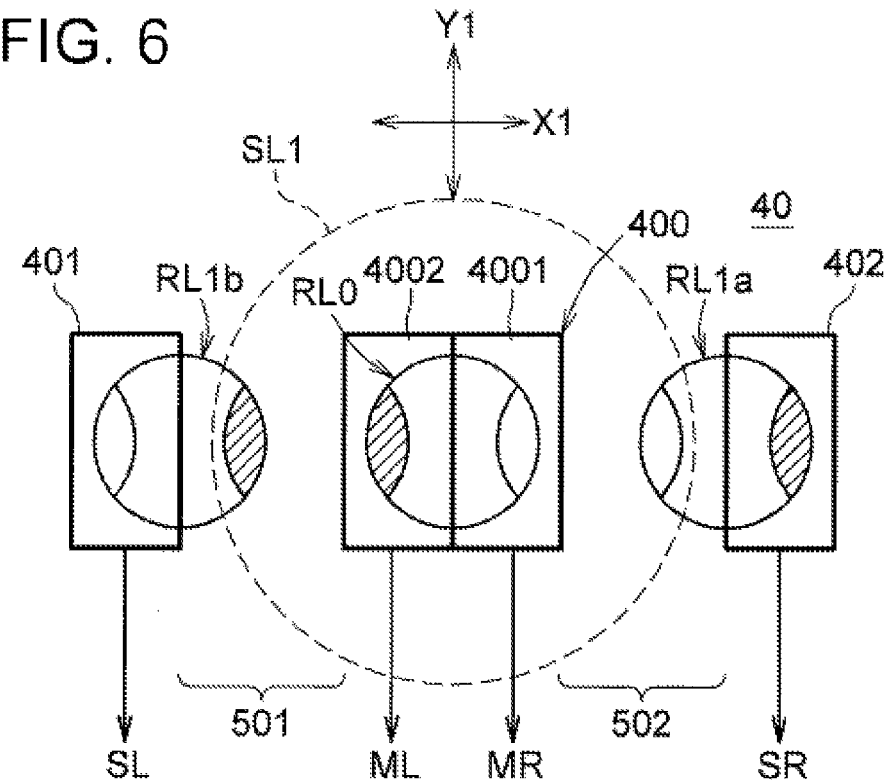
FIG. 6 shows an example of the positional relationship between other-layer stray light and the photodetector in the first embodiment.

Since the effect of other-layer stray light reflected by an information recording layer next to the target layer (the information recording layer where information is being recorded or reproduced) in the optical disc 2 is greater than the effect of other-layer stray light reflected by other information recording layers, the first secondary light receiving section 401 and second secondary light receiving section 402 should be disposed in positions where stray light SL1 from the information recording layer next to the target layer is not incident, as indicated in FIG. 6.

The first secondary light receiving section 401 and second secondary light receiving section 402 in this embodiment detect only outer portions of the received light spots containing the push-pull component, as shown in FIG. 4, so an offset component $-k \times (S_e - S_H)$, $-k \times S_E$, or $k \times S_H$ which has a relatively large amplitude and contains only a small amount of the noise component due to other-layer stray light can be generated. Accordingly, the gain coefficient k can be reduced. Therefore, interlayer crosstalk caused by other-layer stray light can be effectively suppressed, and the offset component can be removed from the main push-pull signal MPP with high precision.

If the optical disc 2 is a super-resolution optical disc as described above, a certain tilt margin can be maintained by thinning the cover layer covering the information recording layer. If the optical disc 2 is a super-resolution optical disc having a plurality of information recording layers, thinning the cover layer makes it necessary to narrow the distance between the information recording layers in order to maintain downward compatibility with BDs and other existing optical discs. When coma aberration occurs because the super-resolution optical disc is tilted, crosstalk (in the track direction or the radial direction of the optical disc 2) increases with the increase in the diameter and flare of the focused spot due to the coma aberration, degrading the reproduced signal; at the same time, the peak intensity of the focused spot is reduced. The reduced peak intensity degrades the condition of the aperture (the local region where super resolution is produced), which is fundamental to super-resolution reproduction, leading to a lowering of super-resolution reproduction performance. Consequently, disc tilt degrades reproduction performance more than it does in a conventional BD. Accordingly, there is a problem in that super-resolution optical discs have a narrower reproduction margin than BDs in players or player-recorders based on the BD standard.

In the BD standard, the thickness of the transparent cover layer covering the information recording surface of a single-layer BD is set at 0.1 m, as described in non-patent reference 1. The focus on the information recording surface disposed under the transparent layer worsens in relation to the angle of tilt of the optical disc with respect to the optical axis. This problem is caused by coma aberration. In general, coma aberration is substantially proportional in magnitude to the thickness of the transparent layer. The thickness of the transparent layer in the BD standard was determined so as to provide adequate reproduction performance in a range of variation of the angle of inclination within which there is a satisfactory level of precision. The transparent layer of a super-resolution optical disc, however, is preferably thinner than the 0.1-mm thick transparent layer of a BD. If a two-layer-disc having two information recording surfaces is considered, whereas a two-layer BD has a transparent layer 0.1 mm thick covering the first layer, the transparent layer covering the second layer is 0.075 mm thick, and the distance between the two layers is 0.025 mm. If these values are directly applied to a super-resolution optical disc, to maintain compatibility, the transparent layer covering the second layer of the super-resolution optical disc must be even thinner than 0.075 mm. The same applies to three-layer and four-layer discs; the transparent layer of a super-resolution optical disc must be thinner than the transparent layer of a BD.

If the transparent layer of a super-resolution optical disc is thinner than the transparent layer used in a BD, the distance between the surface of the optical disc and the information recording layer is reduced accordingly, increasing susceptibility to damage, and a loss of manufacturability corresponding to the reduced thickness of the transparent layer can be envisioned. General BD players have a function to cancel spherical aberration generated by changes in thickness of the transparent layer, but if the spherical aberration of a super-resolution optical disc exceeds the correction range used for BDs, the specifications change, and compatibility with BD players is lost. Therefore, in a super-resolution optical disc having a plurality of information recording layers, the spacing between information recording layers must be reduced to ensure downward compatibility with BDs and other current optical discs.

A narrow spacing between information recording layers, however, can cause interlayer crosstalk. If the spacing between the target layer and an adjacent information recording layer is narrowed, the density of unwanted reflected light increases accordingly, increasing the crosstalk component to a problematic level.

In this embodiment, even if the optical disc 2 is a super-resolution optical disc having a plurality of information recording layers and even if the spacing between the information recording layers is narrower than the spacing between information recording layers in current BDs, interlayer crosstalk due to other-layer stray light can be effectively suppressed, and the offset component can be removed from the main push-pull signal MPP with high precision.

Variation of the First Embodiment

Figure 7:
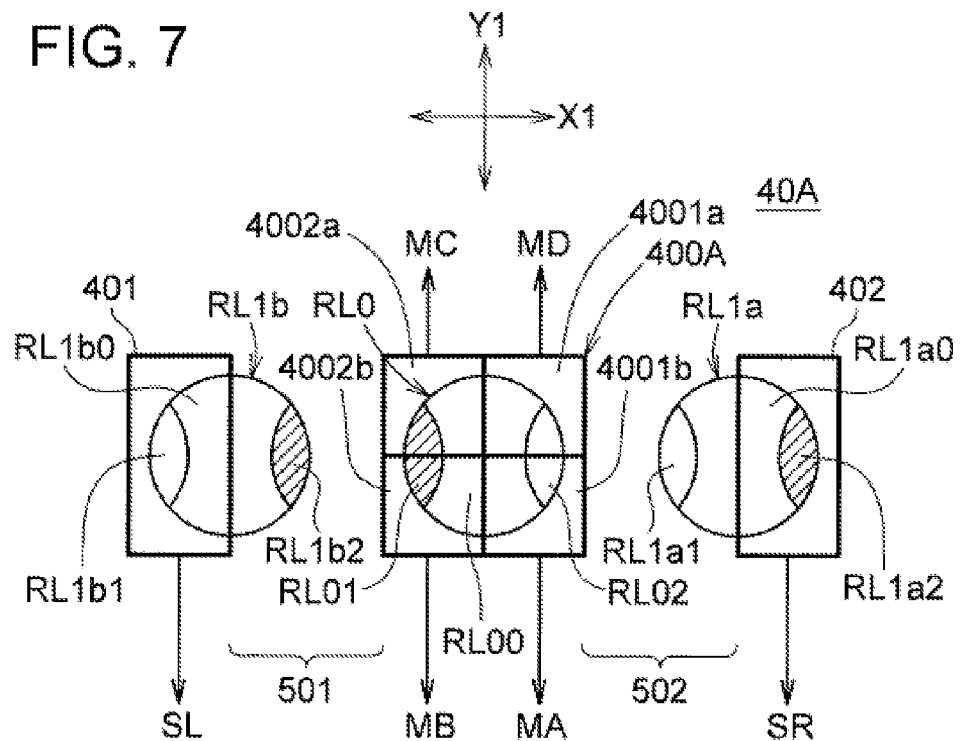
FIG. 7 schematically shows the structure of a photodetector that is a variation of the photodetector in FIG. 4.

FIG. 7 schematically shows the structure of a photodetector 40A that is a variation of the photodetector 40 shown in FIG. 4. The structure of the photodetector 40A in FIG. 7 is the same as the structure of the photodetector 40 in FIG. 4 except that the light receiving surface of the primary light receiving section 400A is divided into four parts.

As shown in FIG. 7, the primary light receiving section 400A of the photodetector 40A is divided into four main light receiving surfaces 4001a, 4001b, 4002a, 4002b. Main light receiving surfaces 4001a and 4001b are aligned in the Y1-axis direction, corresponding to the tangential direction Y of the optical disc 2. Main light receiving surfaces 4002a and 4002b are also aligned in the Y1-axis direction, corresponding to tangential direction Y. The pair of main light receiving surfaces 4001a and 4001b corresponds to the first main light receiving surface 4001 in FIG. 4, and the pair of main light receiving surfaces 4002a and 4002b corresponds to the second main light receiving surface 4002 in FIG. 4.

In this variation, the servo signal detection unit 133 can generate a push-pull signal PP as a tracking servo control signal according to the following equations (3) and (3a):

$$PP = MPPa + k \times (S_E - S_H) \quad (3)$$

$$MPPa = (S_A + S_D) - (S_B + S_C) \quad (3a)$$

In equation (3), $S_A$ represents a detected signal obtained from the output signal MA of main light receiving surface 4001b; $S_B$ represents a detected signal obtained from the output signal MB of main light receiving surface 4002b; $S_C$ represents a detected signal obtained from the output signal MC of main light receiving surface 4002a; $S_D$ represents a detected signal obtained from the output signal MD of main light receiving surface 4001a; $S_E$ represents a detected signal obtained from the output signal SL of the first secondary light receiving section 401; $S_H$ represents a detected signal obtained from the output signal SR of the second secondary light receiving section 402; and k is a gain coefficient. MPPa in equation (3a) is the main push-pull signal.

Alternatively, the push-pull signal PPLa or PPRa may be generated according to the following equation (3A) or (3B).

$$PPLa = MPPa + k \times S_E \quad (3A)$$

$$PPRa = MPPa + k \times (-S_H) \quad (3B)$$

A focus error signal FES based on the astigmatic method can be obtained according to the following equation (4).

$$FES = (S_A + S_C) - (S_B + S_D) \quad (4)$$

Further, a reproduced signal $S_{RF}$ can be generated according to the following equation (5):

$$S_{RF} = S_A + S_B + S_C + S_D \quad (5)$$

Second Embodiment

Figure 8:
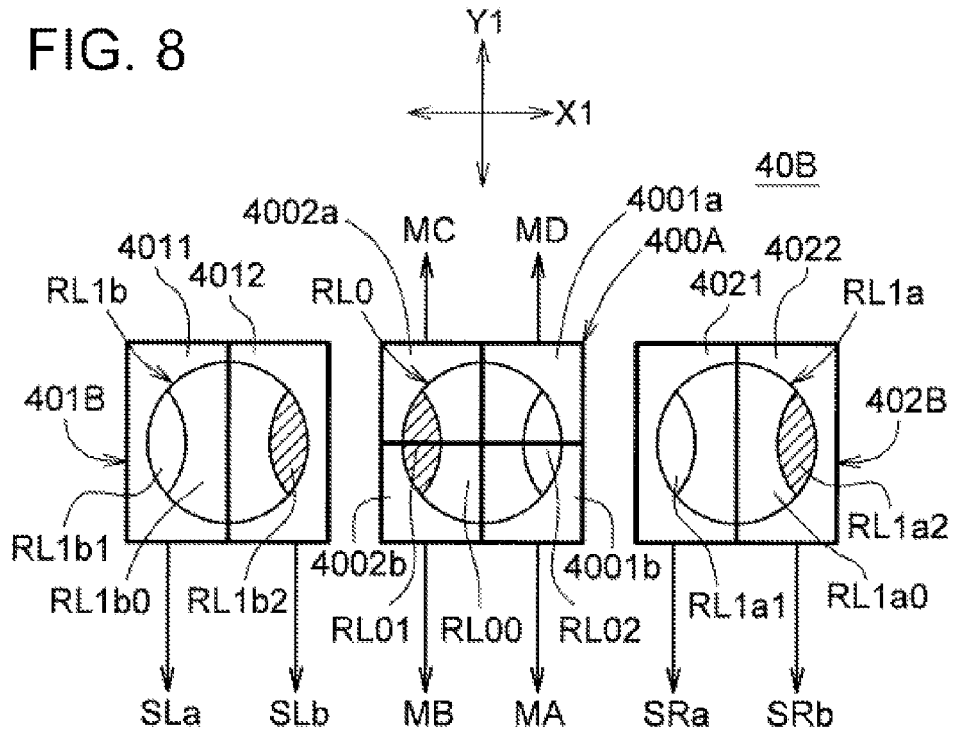
FIG. 8 schematically shows the structure of a photodetector in a second embodiment of the invention.

Next, a second embodiment of the invention will be described. FIG. 8 schematically shows the structure of the photodetector 40B in the second embodiment. The structure of the optical head device and optical disc device in the second embodiment is substantially the same as the structure of the optical head device 11 and optical disc device 1 in the first embodiment except for the structure of the photodetector 40B in FIG. 8. In this embodiment, a photodetector 40B having the general-purpose light receiving surface pattern employed in the three-beam push-pull method is used instead of the photodetector 40 in FIG. 4.

As shown in FIG. 8, the photodetector 40B includes a primary light receiving section 400A that receives the light spot of returning light beam RL0, which is the zero-order diffracted light, a first secondary light receiving section 401B that receives the light spot of returning light beam RL1b, which is the +1-order diffracted light, and a second secondary light receiving section 402B that receives the light spot of returning light beam RL1a, which is the −1-order diffracted light. The structure of the primary light receiving section 400A is the same as the structure of the primary light receiving section 400A in FIG. 7 described earlier.

In this embodiment, the first secondary light receiving section 401B is divided into two parts, an outer secondary light receiving surface 4011 and an inner secondary light receiving surface 4012; the outer secondary light receiving surface 4011 and inner secondary light receiving surface 4012 are aligned in the X1-axis direction. The second secondary light receiving section 402B is divided into two parts, an inner secondary light receiving surface 4021 and an outer secondary light receiving surface 4022; the inner secondary light receiving surface 4021 and outer secondary light receiving surface 4022 are aligned in the X1-axis direction. The first secondary light receiving section 401B is disposed outward of the primary light receiving section 400 in the positive X1-axis direction (left), and the second secondary light receiving section 402B is disposed outward of the primary light receiving section 400 in the negative X1-axis direction (right).

As shown in FIG. 8, in the first secondary light receiving section 401B, the outer secondary light receiving surface 4011, which is the light receiving surface disposed in a position most widely separated from the primary light receiving section 400 in the two divided light receiving surfaces of the first secondary light receiving section 401B, generates an electrical signal SLa in accordance with the amount of received light by performing photoelectric conversion of an outer portion of the received light spot of the returning light beam RL1b of the +1-order diffracted light, and supplies electrical signal SLa to the signal processing circuit 13. The inner secondary light receiving surface 4012, which is the light receiving surface disposed in a position most closely separated from the primary light receiving section 400 in the two divided light receiving surfaces of the first secondary light receiving section 401B, generates an electrical signal SLb in accordance with the amount of received light by performing photoelectric conversion of an inner portion of the received light spot of the returning light beam RL1b of the +1-order diffracted light, and supplies electrical signal SLb to the signal processing circuit 13.

In the second secondary light receiving section 402B, the outer secondary light receiving surface 4022, which is the light receiving surface disposed in a position most widely separated from the primary light receiving section 400 in the two divided light receiving surfaces of the second secondary light receiving section 402B, generates an electrical signal SRb in accordance with the amount of received light by performing photoelectric conversion of an outer portion of the received light spot of the returning light beam RL1a of the −1-order diffracted light, and supplies electrical signal SRb to the signal processing circuit 13. The inner secondary light receiving surface 4021, which is the light receiving surface disposed in a position most closely separated from the primary light receiving section 400 in the two divided light receiving surfaces of the second secondary light receiving section 402B, generates an electrical signal SRa in accordance with the amount of received light by performing photoelectric conversion of an inner portion of the received light spot of the returning light beam RL1a of the −1-order diffracted light, and supplies electrical signal SRa to the signal processing circuit 13.

The servo signal detection unit 133 has the function of selectively generating either of two push-pull signals PP1 and PP2 as a tracking servo control signal. Push-pull signal PP1 is given by the following equations (6) and (6a), which are substantially the same as equations (3) and (3b):

$$PP1 = MPPa + \alpha \times (S_{Ea} - S_{Hb}) \quad (6)$$

$$MPPa = (S_A + S_D) - (S_B + S_C) \quad (6a)$$

Here, $S_A$ represents a detected signal obtained from the output signal MA of main light receiving surface 4001b; $S_B$ represents a detected signal obtained from the output signal MB of main light receiving surface 4002b; $S_C$ represents a detected signal obtained from the output signal MC of main light receiving surface 4002q, $S_D$ represents a detected signal obtained from the output signal MD of main light receiving surface 4001a; $S_{Ea}$ represents a detected signal obtained from the output signal SLa of outer secondary light receiving surface 4011; $S_{Hb}$ represents a detected signal obtained from the output signal SRb of outer secondary light receiving surface 4022; and α is a gain coefficient. MPPa in equation (6a) is a main push-pull signal.

Secondary push-pull signal PP2 is given by the following equation (7):

$$PP2=PP1-\beta \times (S_F-S_G) \qquad (7)$$

Here, $S_F$ represents a detected signal obtained from the output signal SLb of the inner secondary light receiving surface 4012, $S_G$ represents a detected signal obtained from the output signal SRa of the inner secondary light receiving surface 4021, and β is a gain coefficient.

The gain coefficients α and β in the servo signal detection unit 133 are independently set to optimum values. The servo signal detection unit 133 can therefore generate a high-quality push-pull signal PP2 by deducting a first offset component $-\alpha \times (S_{Ea}-S_{Hb})$ due to objective lens shift and a second offset component $\beta \times (S_F-S_G)$ due to objective lens shift from the main push-pull signal MPPa.

Figure 9:
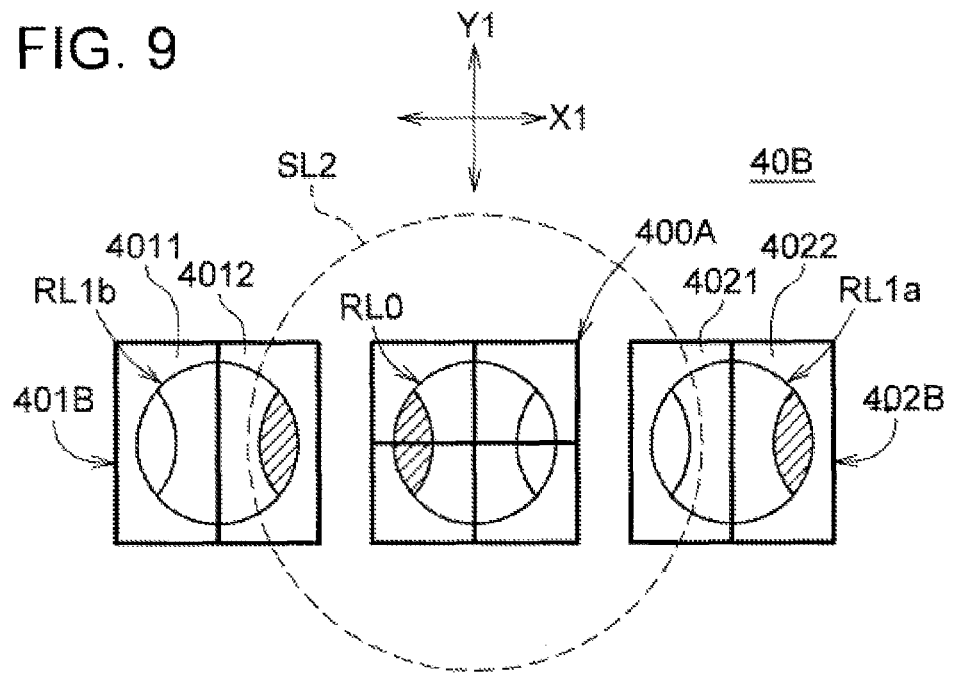
FIG. 9 shows an example of the positional relationship between other-layer stray light and the photodetector in the second embodiment.

If the optical disc 2 is a multilayer optical disc with a narrow spacing between information recording layers, other-layer stray light SL2 reflected by the information recording layer, among the plurality of information recording layers in the optical disc 2, that is next to the target layer and closest in the optical axis direction is incident on the photodetector 40B, as shown in FIG. 9. In comparison with stray light from other information recording layers (not shown), the stray light SL2 from the other layer closest to the target layer among the plurality of information recording layers of the optical disc 2 forms a light spot in a narrower area around the central point of the primary light receiving section 400A (substantially the point of intersection of the two dividing lines of the primary light receiving section 400A). The light intensity of the stray light SL2 from this other layer is greater than the intensity of the stray light from the other information recording layers, and the offset component due to objective lens shift that is added to the main push-pull signal MPPa by the stray light SL2 from this other layer is greater than the offset component that that is added to the main push-pull signal MPPa by stray light from the other information recording layers. Light received by the inner secondary light-receiving surface 4012 includes a push-pull component formed by the −1-order reflectively diffracted light component RL1b2 and the zero-order reflectively diffracted light component RL1b0, and light received by the inner secondary light receiving surface 4021 includes a push-pull component formed by the +1-order reflectively diffracted light component RL1a1 and the zero-order reflectively diffracted light component RL1a0a. The push-pull component in inner secondary light receiving surface 4012 and the push-pull component in the inner secondary light receiving surface 4021 have mutually opposite phases. Accordingly, the two push-pull components substantially cancel out, and the $S_F-S_G$ signal component in equation (7) represents mainly the offset component due to other-layer stray light, the offset component due to zero-order reflectively diffracted light component RL1a0, and the offset component due to zero-order reflectively diffracted light component RL1b0.

From that viewpoint, the gain coefficient α is preferably set to a value that cancels the offset components produced by the returning light beams RL1b, RL1a from the target layer, and the gain coefficient β is preferably set to a value that cancels the offset component produced by other-layer stray light SL2. Then, the offset component $-\alpha \times (S_{Ea}-S_{Hb})$ produced by the returning light beams RL1b, RL1a reflected by the target layer and the offset component $\beta \times (S_F-S_G)$ produced by other-layer stray light can be generated separately. Therefore, even when information is being written onto or reproduced from a multilayer optical disc, the offset components can be removed from the main push-pull signal MPPa with very high precision.

The servo signal detection unit 133 can also generate a reproduced RF signal $S_{RFb}$ according to the following equation (8):

$$S_{RFb}=S_A+S_B+S_C+S_D-\gamma \times (S_F+S_G) \qquad (8)$$

Here, γ is a gain coefficient for cancelling the signal component due to other-layer stray light from the main component $S_{RF}$ (=$S_A+S_B+S_C+S_D$) of the reproduced signal. By using equation (8), the noise component due to other-layer stray light can be removed from the main component $S_{RF}$ of the reproduced signal with high precision.

A focus error signal FES based on the astigmatic method can be obtained according to the following equation (9).

$$FES=(S_A+S_C)-(S_B+S_D) \qquad (9)$$

In the optical head device in the second embodiment, push-pull signals PP1, PP2 from which the offset component due to objective lens shift has been removed with high precision can be generated as tracking servo control signals, by using a photodetector 40B having a simple general-purpose light receiving surface pattern, as described above. By using equation (7) in particular, the offset component due to objective lens shift can be removed with very high precision.

When equation (7) is used, outer secondary light receiving surface 4011 and outer secondary light-receiving surface 4022 are disposed outward of the outer perimeter of other-layer stray light SL2, and inner secondary light receiving surface 4012 and inner secondary light receiving surface 4021 are disposed inward of the outer perimeter of other-layer stray light SL2, as in the example shown in FIG. 9. In order to maximize the effect of removal of the offset component, the outer perimeter of the other-layer stray light preferably substantially matches the boundary line (dividing line) between outer secondary light receiving surface 4011 and inner secondary light receiving surface 4012 and preferably also substantially matches and the boundary line (dividing line) between outer secondary light receiving surface 4022 and inner secondary light receiving surface 4021.

Variations of the Second Embodiment

Figure 10:
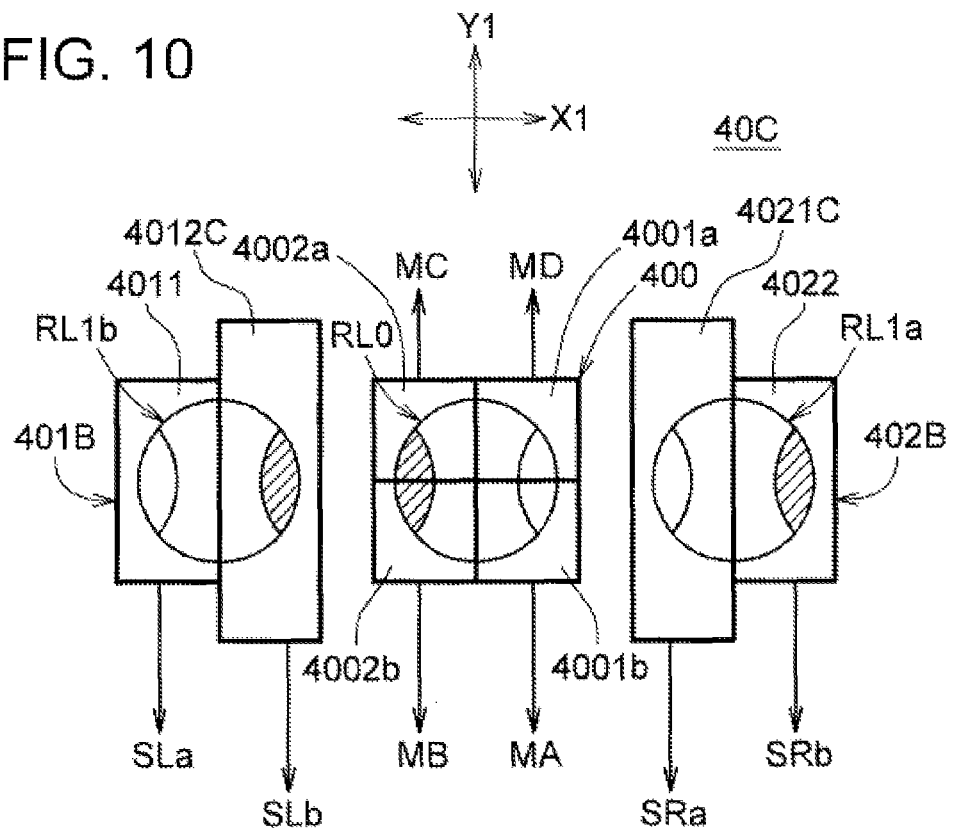
FIG. 10 schematically shows the structure of a photodetector that is a variation of the photodetector in FIG. 8.

FIG. 10 schematically shows the structure of a photodetector 40C that is a variation of the photodetector 40B shown in FIG. 8.

As shown in FIG. 10, photodetector 40C includes a primary light receiving section 400 together with a first secondary light receiving section 401B and a second secondary light receiving section 402B disposed on both sides of the primary light receiving section 400 in the X1-axis direction. The first secondary light receiving section 401B includes a paired outer secondary light receiving surface 4011 and inner secondary light receiving surface 4012C; the second secondary light receiving section 402B includes a paired outer secondary light receiving surface 4022 and inner secondary light receiving surface 4021C.

The structure of the photodetector 40C in this embodiment is the same as the structure of the photodetector 40B in FIG. 8 except for the dimensions of inner secondary light receiving surface 4012C and inner secondary light receiving surface 4021C. As shown in FIG. 10, the inner secondary light receiving surface 4012C of the first secondary light receiving section 401B has a larger light receiving area than the outer secondary light receiving surface 4011, and the inner secondary light receiving surface 4021C of the second secondary light receiving section 402B has a larger light receiving area than the outer secondary light receiving surface 4022. Inner secondary light receiving surface 4012C generates an electrical signal SLb based on the amount of received light by performing photoelectric conversion of an inner portion of the received light spot of the returning light beam RL1b of the +1-order diffracted light and supplies this electrical signal SLb to the signal processing circuit 13. Inner secondary light receiving surface 4021C generates an electrical signal SLa based on the amount of received light by performing photoelectric conversion of an inner portion of the received light spot of the returning light beam RL1a of the −1-order diffracted light and supplies this electrical signal SLa to the signal processing circuit 13.

In this embodiment, the light receiving areas of the inner secondary light receiving surfaces 4012C, 4021C are larger than those of the inner secondary light receiving surfaces 4012, 4021 in FIG. 8. If the optical disc 2 is a multilayer optical disc, the amount of other-layer stray light received by the inner secondary light receiving surfaces 4012C, 4021C can be increased. Accordingly, the offset component $\beta \times (S_F - S_G)$ can be generated even when the value of the gain coefficient $\beta$ in equation (7) is reduced. The push-pull components received by the inner secondary light receiving surfaces 4012C, 4021C can also be cancelled with high precision.

Third Embodiment

Figure 11:
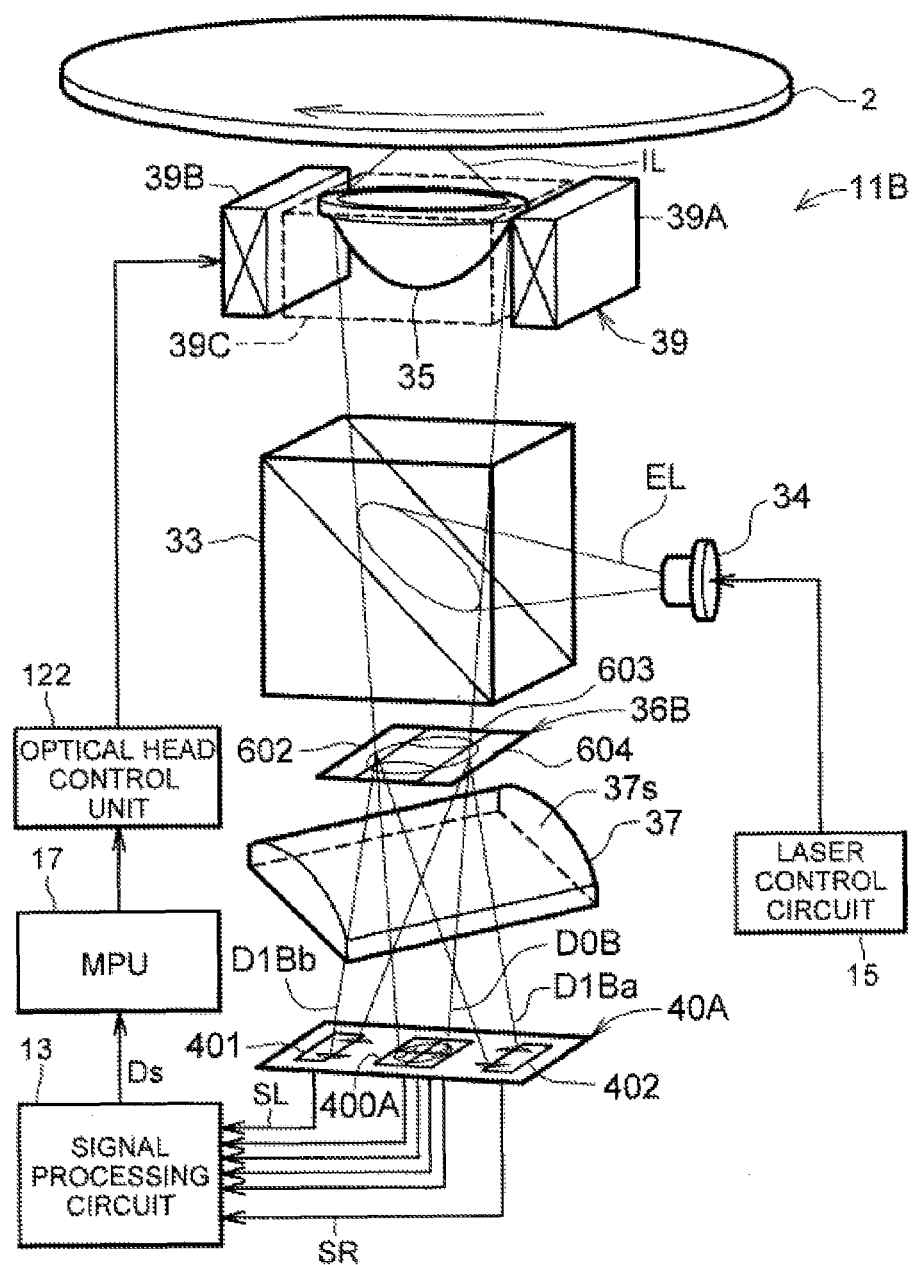
FIG. 11 schematically shows the basic configuration of the optical head device in a third embodiment of the invention.

Next, a third embodiment of the invention will be described. FIG. 11 schematically shows the basic configuration of the optical head device 11B in the third embodiment. The structure of the optical disc device in this embodiment is substantially the same as the structure of the optical disc device 1 in the first embodiment except for part of the structure of the optical head device 11B. As shown in FIG. 11, the optical head device 11B includes a beam splitter 33, a semiconductor laser 34, an objective lens 35, a cylindrical lens 37, an actuator 39, and a photodetector 40A. The basic functions of these elements 33, 34, 35, 37, 39 are respectively the same as the functions of elements 33, 34, 35, 37, 39 in the first embodiment, shown in FIG. 2.

FIG. 11 shows the components in order to illustrate the basic structure and operating principle of the optical head device 11B in this embodiment; the configuration of the optical head device 11B is not limited to the configuration shown in FIG. 11. For example, the optical head device 11B may include a sensor optical system for detecting the amount of focusing error or tracking error of the objective lens 35 with respect to the information recording layer in the optical disc 2.

The optical head device 1 in this embodiment includes a hologram optical element 36B for transmissively diffracting the returning light beam reflected by the optical disc 2. The optical head device 11 in the first embodiment includes the optical element 36 shown in FIG. 2. Optical element 36 generates three diffracted light beams D0, D1b, D1a by transmissively diffracting the light beam EL emitted from the semiconductor laser 34, and three focused spots of the diffracted light beams D0, D1b, D1a are formed in the target layer Lx of the optical disc 2, as shown in FIG. 3.

In the present embodiment, no optical element for generating a diffracted light beam is provided in the optical path between the semiconductor laser 34 and the optical disc 2, so a single focused spot is formed on the target layer in the optical disc 2. The returning light beam reflected by the optical disc 2 is changed to a convergent light beam by the objective lens 35, passes through the beam splitter 33, and enters the hologram optical element 36B, which is a transmissive diffraction grating (hologram optical element). The hologram optical element 36B transmits and diffracts the incident light and generates a zero-order diffracted light beam D0B, a +1-order diffracted light beam D1Bb, and a −1-order diffracted light beam D1Ba.

Figure 12:
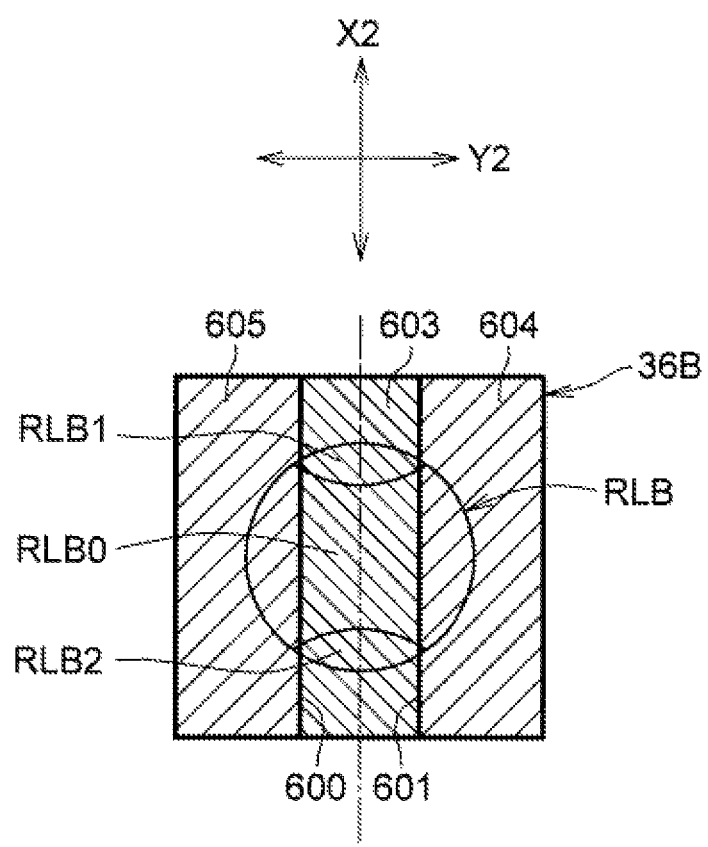
FIG. 12 is a plan view schematically showing the structure of the diffraction grating surface of the optical element in the third embodiment.

FIG. 12 is a plan view schematically showing the structure of the diffraction grating surface of the hologram optical element 36B. As shown in FIG. 12, the hologram optical element 36B includes three diffraction regions: a primary diffraction region 603 having mainly zero-order and ±1-order diffractive effects, and a pair of secondary diffraction regions 604, 605 having mainly zero-order and ±1-order diffractive effects. Optical element 36 uses a plate-shaped light-transmitting base member made of a plastic or glass material and is fabricated by forming a number of diffraction grating grooves on one or both of the light incidence surface and the light exit surface of the light-transmitting base member. Separate diffractive patterns can be formed in the primary diffraction region 603 and the pair of secondary diffraction regions 604, 605 by specifying the profile, direction, and spacing of the diffraction grooves separately for each diffraction region. The secondary diffraction regions 604, 605 are disposed outward of the primary diffraction region 603 in the Y2-axis direction, corresponding to the tangential direction of the optical disc 2. The secondary diffraction regions 604, 605 have line-symmetric shapes with respect to the centerline in an X2-axis direction (the direction corresponding to the radial direction of the optical disc 2) orthogonal to the Y2-axis direction. The primary diffraction region 603 and secondary diffraction region 605 are mutually separated by a boundary line 600 parallel to the X2-axis direction; the primary diffraction region 603 and secondary diffraction region 604 are mutually separated by a boundary line 601 parallel to the X2-axis direction.

As shown in FIG. 12, a light spot of the returning light beam RLB is formed on the diffraction grating surface of the hologram optical element 36B. The returning light beam reflected by the information recording layer in the optical disc 2 includes reflectively diffracted light due to the periodic structure of the information tracks in the information recording layer. The light spot of the returning light beam RLB includes a substantially circular zero-order reflectively diffracted light component (zero-order light component of the reflectively diffracted light) RLB0, a +1-order reflectively diffracted light component (+1-order light component of the reflectively diffracted light) RLB1 overlapping the zero-order reflectively diffracted light component RLB0 at one edge, and a −1-order reflectively diffracted light component (−1-order light component of reflectively diffracted light) RLB2 overlapping the zero-order reflectively diffracted light component RLB0 at another edge. The direction of the row formed by the zero-order reflectively diffracted light component RLB0 and the ±1-order reflectively diffracted light components RLB1, RLB2 substantially coincides with the X2-axis direction.

The primary diffraction region 603 should be positioned where part of the zero-order reflectively diffracted light component RLB0 and all or a central part (part excluding both end parts in the Y2-axis direction) of the ±1-order reflectively diffracted light components RLB1, RLB2 are incident. The secondary diffraction regions 604, 605 should be formed in positions where the remaining portion of the zero-order reflectively diffracted light component RLB0 is incident and none of the ±1-order reflectively diffracted light components RLB1, RLB2 or none of the central parts is incident.

As shown in FIG. 11, the zero-order diffracted light beam D0B passes through the primary diffraction region 603 and secondary diffraction regions 604, 605 and illuminates the primary light receiving section 400A of the photodetector 40A. The +1-order diffracted light beam D1Bb generated by the +1-order diffractive effect of the pair of secondary diffraction regions 604, 605 is directed onto the first secondary light receiving section 401 of the photodetector 40A, and the −1-order diffracted light beam D1Ba generated by the −1-order diffractive effect of the pair of secondary diffraction regions 604, 605 is directed onto the second secondary light receiving section 402 of the photodetector 40A. The primary diffraction region 603 also generates ±1-order diffracted light beams, but these ±1-order diffracted light beams are unnecessary diffracted light and should illuminate a region in the photodetector 40A where no light receiving section (photoelectric conversion section) is formed, or a region outside the photodetector 40.

Figure 13:
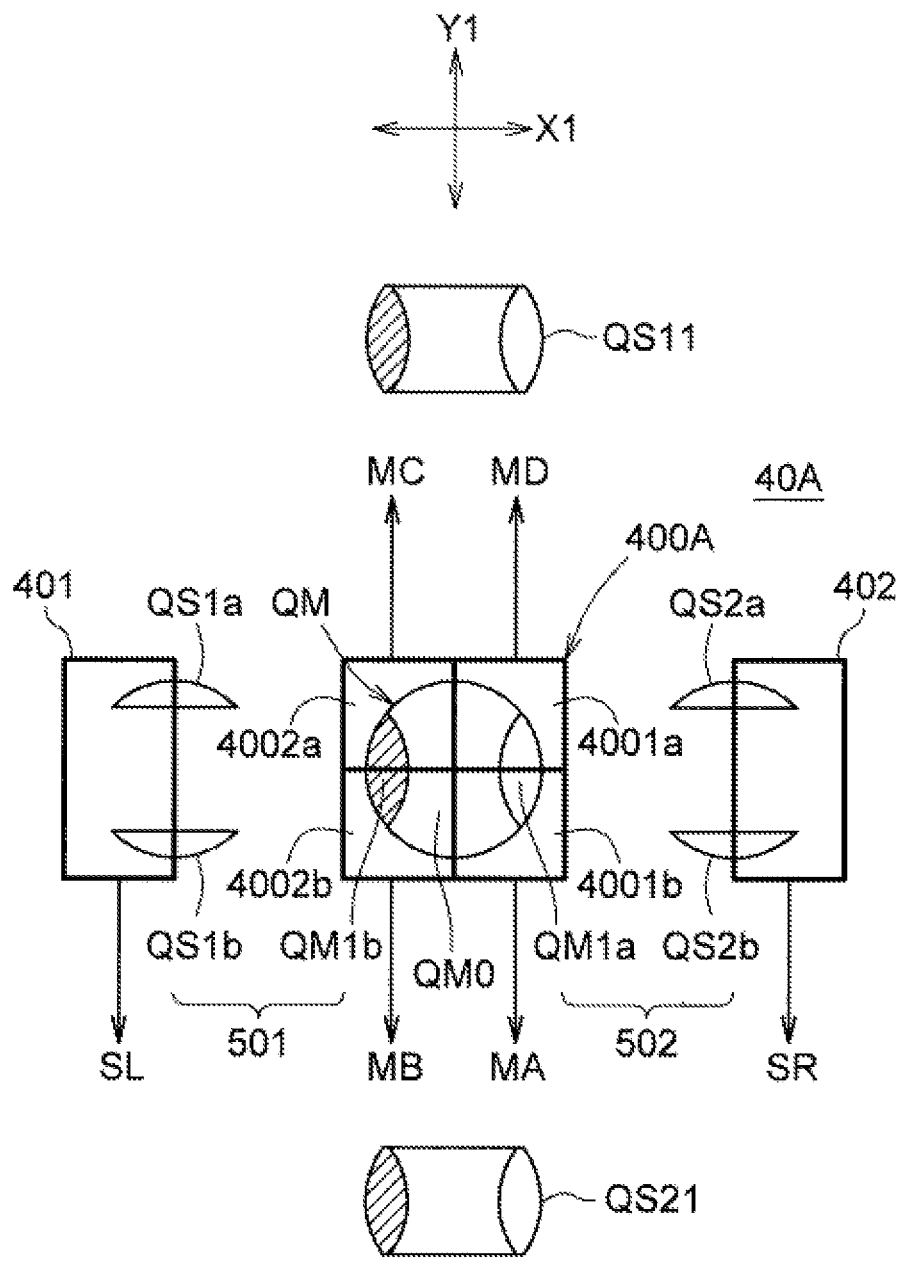
FIG. 13 schematically shows the light receiving surface of the photodetector in the third embodiment.

FIG. 13 schematically shows an example of the light receiving surface of the photodetector 40A. The light receiving surface pattern of the photodetector 40A in FIG. 13 is the same as the light receiving surface pattern of the photodetector 40A in the variation of the first embodiment in FIG. 7.

The light spot QM of the zero-order diffracted light beam D0B on the primary light receiving section 400A has a substantially circular or elliptical shape, as shown in FIG. 13. The light spot QM includes a zero-order reflectively diffracted light component QM0, and a +1-order reflectively diffracted light component QM1a and a −1-order reflectively diffracted light component QM1b that overlap component QM0. The zero-order reflectively diffracted light component QM0 and ±1-order reflectively diffracted light components QM1a, QM1b are due to the structure of the information tracks in the optical disc 2. The zero-order reflectively diffracted light component QM0 is received by the four light-receiving surfaces 4001a, 4001b, 4002a, 4002b of the main light-receiving section 400A. The −1-order reflectively diffracted light component QM1b is received by light-receiving surfaces 4002a and 4002b; the +1-order reflectively diffracted light component QM1a is received by light receiving surfaces 4001a and 4001b.

Light spots QS1a, QS1b of the +1-order diffracted light beam D1Bb are detected by the first secondary light receiving section 401. The light spots QS1a, QS1b are paired and have an outer semicircular arc shape or semi-elliptical arc shape, as shown in FIG. 13. These light spots QS1a, QS1b include a zero-order reflectively diffracted light component as their main component and include hardly any of the ±1-order reflectively diffracted light components. The first secondary light receiving section 401 is disposed in a position where just the outer portions of the light spots QS1a, QS1b of the +1-order diffracted light beam D1Bb are detected and outputs an electrical signal SL obtained by performing photoelectric conversion of those portions. The remaining portions of the light spots QS1a, QS1b illuminate non-light-detection region 501 and are not subjected to photoelectric conversion.

Light spots QS2a, QS2b of the −1-order diffracted light beam D1Ba are detected by the second secondary light receiving section 402. These light spots QS2a, QS2b are also paired and have an outer semicircular arc shape or semi-elliptical arc shape. These light spots QS2a, QS2b include a zero-order reflectively diffracted light component as their main component and include hardly any of the ±1-order reflectively diffracted light components. The second secondary light receiving section 402 is disposed in a position where just the outer portions of the light spots QS2a, QS2b of the −1-order diffracted light beam D1Ba are detected and outputs an electrical signal SR obtained by performing photoelectric conversion of those portions. The remaining portions of the light spots QS2a, QS2b illuminate non-light-detection region 502 and are not subjected to photoelectric conversion. The light spots QS11, QS21 of the ±1-order diffracted light beams exiting the primary diffraction region 603 are detected neither by the primary light receiving section 400A nor by the first secondary light receiving section 401 and second secondary light receiving section 402.

In the primary light receiving section 400A, the four light receiving surfaces 4001a, 4001b, 4002a, 4002b output respective electrical signals MD, MA, MC, MB in accordance with the amounts of received light. The first secondary light receiving section 401 outputs an electrical signal SL responsive to the amount of light received in light spots QS1a, QS1b; the second secondary light receiving section 402 outputs an electrical signal SR responsive to the amount of light received in light spots QS2a, QS2b.

Next, the method by which a push-pull signal is generated in this embodiment will be described. A push-pull signal PP is generated in this embodiment by using the equation (3) used in the variation of the first embodiment; this signal can be used as a tracking servo control signal. Since the light spots QS1a, QS1b on the first secondary light receiving section 401 and the light spots QS2a, QS2b on the second secondary light receiving section 402 include few push-pull components, the push-pull component is given mainly by the main push-pull signal MPP ($=(S_A+S_D)-(S_B+S_C)$) in equation (3a).

When the objective lens 35 is shifted from its substantially central position to follow an information track, all of the received light spots are shifted in accordance with the objective lens shift, as in the example shown in FIG. 5. If the objective lens shift moves all the light spots QM0, QS1, QS2 from the reference position shown in FIG. 9 to the left with respect to the photodetector 40, the signal level of the main push-pull signal MPP decreases. At the same time, the amount of light received by the first secondary light receiving section 401 increases and the amount of light received by the second secondary light receiving section 402 decreases, so the signal level of the $S_E-S_H$ signal component of the push-pull signal PP increases. If the objective lens shift moves the light spots QM0, QS1, QS2 from the reference position to the right with respect to the photodetector 40, the signal level of the main push-pull signal MPP increases. At the same time, the amount of light received by the first secondary light receiving section 401 decreases and the amount of light received by the second secondary light receiving section 402 increases, so the signal level of the $S_E-S_H$ signal component of the push-pull signal PP decreases.

That indicates that with respect to objective lens shift, the main push-pull signal MPP and the $S_E$ signal component have mutually opposite phases, and the main push-pull signal MPP and the $-S_H$ signal component have mutually opposite phases. Accordingly, the equation (3) used in the variation of the first embodiment can be used, and by amplifying the $S_E-S_H$ signal component by an appropriately adjusted gain coefficient k, the offset component due to the objective lens shift can be cancelled. The push-pull signal PPL or PPR given by equation (3A) or (3B) may be used instead of using equation (3).

In comparison with the first embodiment, the third embodiment places fewer design constraints on the parameters (diffraction efficiency, diffraction angle, diffraction direction, etc.) of the diffraction structure of the hologram optical element 36B. For example, in the first embodiment, the zero-order diffraction efficiency and the first-order diffraction efficiencies of optical element 36 are specified so as to increase the intensity of the zero-order diffracted light beam D0 to several times the intensity of the ±1-order diffracted light beams D1$a$, D1$b$, in order to improve the utilization efficiency of the zero-order diffracted light beam D0, but there is a constraint in that increasing the light intensity of the ±1-order diffracted light beams D1$a$, D1$b$ decreases the optical intensity of the zero-order diffracted light beam D0 directed onto the information track where information is being written or reproduced, consequently lowering the utilization efficiency of the light. However, this embodiment is free from such constraints because only a single focused spot is directed onto the information track where information is being written or reproduced. Accordingly, the diffraction efficiency of the hologram optical element 36B can be optimized to increase the amounts of light received by the first secondary light receiving sections 401 and the second secondary light receiving section 402. This makes it possible to detect an offset component containing few noise components by reducing the value of the gain coefficient k in equations (3), (3A), and (3B). Therefore, the offset component can be removed from the main push-pull signal MPP with high precision.

Even when information is written onto or reproduced from a multilayer optical disc, interlayer crosstalk can be suppressed efficiently by reducing the noise component due to other-layer stray light, and the amount of variation in offset (offset component) caused by objective lens shift can be removed from the tracking error signal with high precision.

Variation of the Third Embodiment

Figure 14:
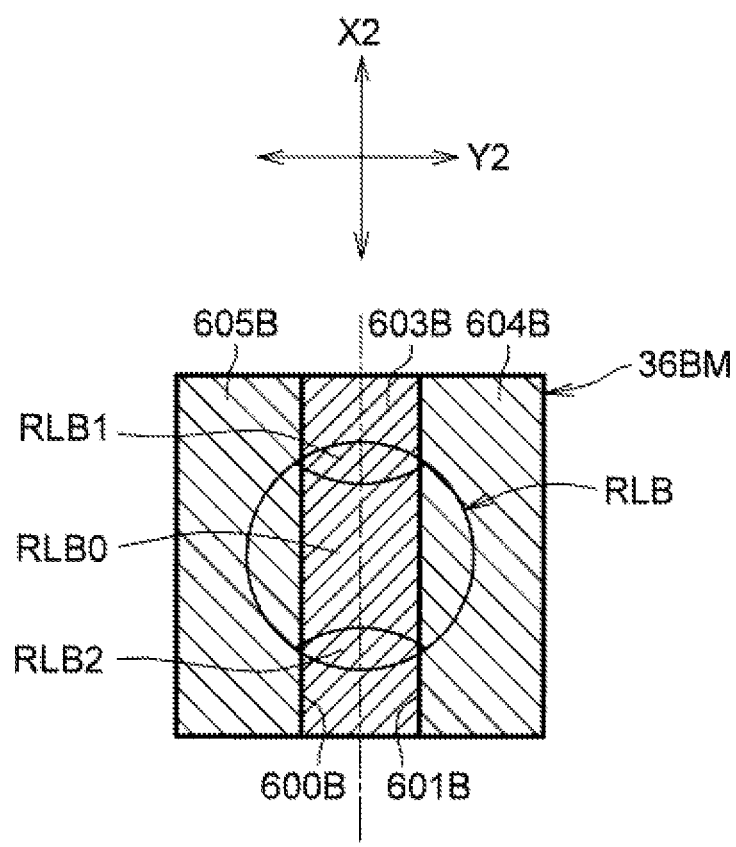
FIG. 14 schematically shows the structure of the diffraction grating surface of an optical element that is a variation of the optical element in FIG. 12.

FIG. 14 schematically shows the structure of the diffraction grating surface of a hologram optical element 36BM that is a variation of hologram optical element 36B. As shown in FIG. 14, hologram optical element 36BM includes a primary diffraction region 603B, a secondary diffraction region 604B, and a secondary diffraction region 605B. Since the third embodiment places few constraints on the parameters of the diffraction structure of hologram optical element 36B, the disposition of the primary light receiving section 400, first secondary light receiving section 401, and second secondary light receiving section 402 can be optimized by changing these parameters. The disposition of the primary diffraction region 603B and secondary diffraction regions 604B, 605B in the hologram optical element 36BM in this variation is the same as the disposition of the primary diffraction region 603 and secondary diffraction regions 604, 605 shown in FIG. 12, but the diffraction structures of the primary diffraction region 603B and secondary diffraction regions 604B, 605B differ from those of the primary diffraction region 603 and secondary diffraction regions 604, 605 in FIG. 12 in terms of diffraction angle and diffraction direction. Otherwise, the diffraction structures are the same.

Figure 15:
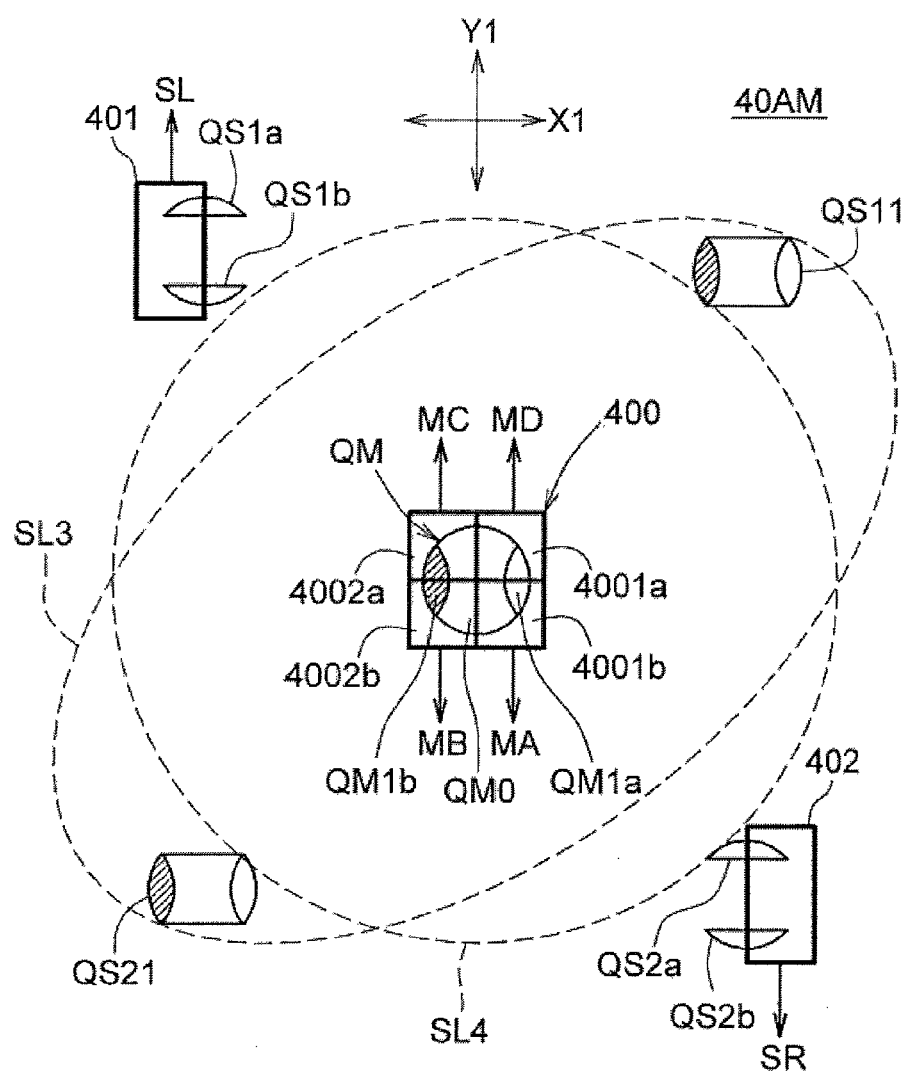
FIG. 15 schematically shows the light receiving surface pattern of a photodetector that is a variation of the photodetector in FIG. 13.

FIG. 15 schematically shows the light receiving surface pattern of a photodetector 40AM that receives the diffracted light beam exiting the hologram optical element 36BM in FIG. 14. The structure of the photodetector 40AM in FIG. 15 is the same as the structure of the photodetector 40A in FIG. 13 except for the disposition of the first secondary light receiving section 401 and second secondary light receiving section 402.

As shown in FIG. 15, even if the optical disc 2 is a multi-layer optical disc, the first secondary light receiving section 401 and second secondary light receiving section 402 are disposed in positions where stray light SL3, SL4 from other layers will not be received. The optical disc 2 here has at least three information recording layers. Other-layer stray light SL3 is light reflected from an information recording layer next to the target layer in the optical disc 2 on the side facing the light incidence surface of the optical disc 2, and other-layer stray light SL4 is light reflected from an information recording layer next to the target layer in the optical disc 2 on the side opposite the light incidence surface of the optical disc 2.

Disposing the first secondary light receiving section 401 and second secondary light receiving section 402 in positions free of other-layer stray light SL3, SL4 reduces the amounts of stray light received by the first secondary light receiving section 401 and second secondary light receiving section 402, so noise components in the reproduced signal and servo signals can be reduced.

REFERENCE CHARACTERS 1 optical disc device, 2 optical disc, 11, 11B optical head device, 12 servo control circuit, 121 spindle motor control unit, 122 optical head control unit, 123 sled motor control unit, 13 signal processing circuit, 131 reproduced signal detection unit, 132 wobble signal detection unit, 133 servo signal detection unit, 14 modulation circuit, 15 laser control circuit, 16 demodulation circuit, 17 MPU (Micro Processor Unit), 18 memory, 19 spindle motor, 22 sled motor, 23 interface (I/F), 33 beam splitter, 34 semiconductor laser, 35 objective lens, 36 optical element, 36B, 36BM hologram optical element, 603, 603B primary diffraction region, 604, 604B secondary diffraction region, 605, 605B secondary diffraction region, 37 cylindrical lens, 39 actuator, 40, 40A, 40AM, 40B, 40C photodetector, 400, 400A primary light receiving section, 401, 401B first secondary light receiving section, 4011, 4022 outer secondary light receiving surface, 4012, 4012C inner secondary light receiving surface 402, 402B second secondary light receiving section, 4021, 4021C inner secondary light receiving surface, 501, 502 non-light-detection region.

What is claimed is:
1. An optical disc device comprising:
an optical head device;
a disc drive unit for spinning an optical disc;
a signal processing unit for generating a tracking servo control signal on a basis of a signal detected by the optical head device; and
a servo control unit for performing control to shift an objective lens in a radial direction of the optical disc in response to the tracking servo control signal; wherein
the optical head device includes
a semiconductor laser,
an optical element for transmissively diffracting a light beam output from the semiconductor laser to generate a zero-order diffracted light beam, a +1-order diffracted light beam, and a −1-order diffracted light beam,
an objective lens for focusing the +1-order diffracted light beam and the zero-order diffracted light beam to form a focused spot on an information recording layer in the optical disc, and
a photodetector for receiving the +1-order diffracted light beam and the zero-order diffracted light beam after reflection from the optical disc;
the photodetector includes
a primary light receiving section having a first primary light receiving surface and a second primary light receiving surface aligned in a first direction corresponding to the radial direction of the optical disc, a first secondary light receiving section disposed in a position outwardly separated from the primary light receiving section in a positive direction of the first direction, and a second secondary light receiving section disposed in a position outwardly separated from the primary light receiving section in a negative direction of the first direction;

the first primary light receiving surface and the second primary light receiving surface perform photoelectric conversion of a received light spot of the zero-order diffracted light beam and output, respectively, a first main detected signal and a second main detected signal;

the first secondary light receiving section has a plurality of secondary light receiving surfaces aligned in the first direction;

the plurality of secondary light receiving surfaces include a first outer secondary light receiving surface and a first inner secondary light receiving surface, the first outer secondary light receiving surface being disposed in a position most widely separated from the primary light receiving section in the positive direction of the first direction, the first inner secondary light receiving surface being disposed in a position most closely separated from the primary light receiving section in the positive direction of the first direction;

the second secondary light receiving section has a plurality of secondary light receiving surfaces aligned in the first direction;

the plurality of secondary light receiving surfaces include a second outer secondary light receiving surface and a second inner secondary light receiving surface, the second outer secondary light receiving surface being disposed in a position most widely separated from the primary light receiving section in the negative direction of the first direction, the second inner secondary light receiving surface being disposed in a position most closely separated from the primary light receiving section in the negative direction of the first direction;

the first outer secondary light receiving surface performs photoelectric conversion of an outer portion, in the positive direction of the first direction, of a received light spot of the +1-order diffracted light beam and outputs a first secondary detected signal;

the second outer secondary light receiving surface performs photoelectric conversion of an outer portion, in the negative direction of the first direction, of a received light spot of the −1-order diffracted light beam and outputs a second secondary detected signal;

among the plurality of secondary light receiving surfaces included in the first secondary light receiving section, the first inner secondary light receiving surface has a larger light receiving area than the secondary light receiving surfaces other than the first inner secondary light receiving surface, the first inner secondary light receiving surface having a larger length than the first primary light receiving surface and the second primary light receiving surface in a second direction orthogonal to the first direction;

among the plurality of secondary light receiving surfaces included in the second secondary light receiving section, the second inner secondary light receiving surface has a larger light receiving area than the secondary light receiving surfaces other than the second inner secondary receiving surface, the second inner secondary light receiving surface having a larger length than the first primary light receiving surface and the second primary light receiving surface in the second direction; and the signal processing unit generates a main push-pull signal on a basis of the first primary detected signal and the second primary detected signal, detects an offset component due to relative displacement of the objective lens with respect to the light receiving element, on a basis of by the first secondary detected signal and the second secondary detected signal, and generates the tracking error signal by deducting the offset component from the push-pull signal.

2. An optical head device comprising:

a semiconductor laser;

an objective lens for focusing a single light beam emitted from the semiconductor laser to form a focused spot on an information recording layer of an optical disc;

an optical element for transmissively diffracting a returning light beam reflected from the optical disc; and a photodetector for receiving the transmissively diffracted light beam; wherein the returning light beam includes reflectively diffracted light diffracted by the optical disc;

the optical element includes a primary diffraction region disposed in a position where part of a zero-order reflectively diffracted light component and part or all of ±1-order reflectively diffracted light components in the reflectively diffracted light are incident, having a zero-order diffractive effect and a ±1-order diffractive effect, and a pair of secondary diffraction regions disposed outward of the primary diffraction region in a second direction orthogonal to a first direction, the first direction being a direction of a row formed by the zero-order reflectively diffracted light component and the ±1-order reflectively diffracted light components, in positions where a remaining part of the zero-order reflectively diffracted light component is incident, having the zero-order diffractive effect and the ±1-order diffractive effect;

the photodetector includes a primary light receiving section having a first primary light receiving surface and a second primary light receiving surface aligned in a first direction corresponding to a radial direction of the optical disc, a first secondary light receiving section disposed in a position outwardly separated from the primary light receiving section in a positive direction of the first direction, and a first non-light-detection region disposed between the primary light receiving section and the first secondary light receiving section, extending continuously from an edge of the primary light receiving section in the positive direction of the first direction to an edge of the first secondary light receiving section in a negative direction of the first direction;

the first primary light receiving surface and the second primary light receiving surface perform photoelectric conversion of a received light spot of the zero-order diffracted light beam that has passed through both the primary diffraction region and the pair of secondary diffraction regions and output, respectively, a first main detected signal and a second main detected signal;

the first secondary light receiving section is positioned to detect outer portions, in the positive direction of the first direction, of a pair of received light spots of the +1-order diffracted light beams generated by the +1-order diffractive effect of the pair of secondary diffraction regions, performs photoelectric conversion of said outer portions, and outputs a first secondary detected signal, the pair of received light spots of the +1-order diffracted light beams being aligned in the second direction; and remaining parts of the received light spots of the +1-order diffracted light beams are directed onto the first non-light-detection region.

3. The optical head device of claim 2, wherein:

the photodetector further includes a second secondary light receiving section disposed in a position separated from the primary light receiving section in the negative direction of the first direction, and a second non-light-detection region disposed between the primary light receiving section and the second secondary light receiving section, extending continuously from an edge of the primary light receiving section in the negative direction of the first direction to an edge of the second secondary light receiving section in the positive direction of the first direction;

the second secondary light receiving section is positioned to detect outer portions, in the negative direction of the first direction, of a pair of received light spot of the −1-order diffracted light beam generated by the −1-order diffractive effect of the pair of secondary diffraction regions, performs photoelectric conversion of said outer portions of the pair of received light spots of the −1-order diffracted light beam, and outputs a second secondary detected signal, the pair of received light spots of the −1-order diffracted light beams being aligned in the second direction; and remaining parts of the received light spots of the −1-order diffracted light beams are directed onto the second non-light-detection region.

4. The optical head device of claim 3, wherein:

the optical disc is a multilayer optical disc having a plurality of information recording layers; and the first secondary light receiving section and the second secondary light receiving section are each disposed in a position on which light reflected from those of the plurality of information recording layers that are adjacent to an information recording layer on which information is being written or reproduced is not incident.

5. An optical disc device comprising:

the optical head device of claim 2;

a disc drive unit for spinning the optical disc;

a signal processing unit for generating a tracking servo control signal on a basis of a signal detected by the optical head device; and a servo control unit for performing control to shift the objective lens in a radial direction of the optical disc in response to the tracking servo control signal; wherein the signal processing unit generates a main push-pull signal on a basis of the first primary detected signal, detects an offset component due to relative displacement of the objective lens with respect to the light receiving element, on a basis of the first secondary detected signal, and generates the tracking error signal by deducting the offset component from the push-pull signal.

6. An optical disc device comprising:

the optical head device of claim 3;

a disc drive unit for spinning the optical disc;

a signal processing unit for generating a tracking servo control signal on a basis of a signal detected by the optical head device; and a servo control unit for performing control to shift the objective lens in a radial direction of the optical disc in response to the tracking servo control signal; wherein the signal processing unit generates a main push-pull signal on a basis of the first primary detected signal and the second primary detected signal, detects an offset component due to relative displacement of the objective lens with respect to the light receiving element, on a basis of the first secondary detected signal, and generates the tracking error signal by deducting the offset component from the push-pull signal.

* * * * *